(12) United States Patent
Kubota

(10) Patent No.: US 6,856,042 B1
(45) Date of Patent: Feb. 15, 2005

(54) WIND TURBINE GENERATOR

(76) Inventor: Hisaomi Kubota, 1-5-2-605, Koumyou, Yahatanishi-ku, Kitakyusyu-shi, Hukuoka-ken (JP)

( * ) Notice: Subject to any disclaimer, the term of this patent is extended or adjusted under 35 U.S.C. 154(b) by 0 days.

(21) Appl. No.: 10/681,990

(22) Filed: Oct. 9, 2003

(51) Int. Cl.$^7$ ................................. H02B 9/04
(52) U.S. Cl. ............................. 290/55; 290/44; 290/43; 290/54
(58) Field of Search ............................. 290/55, 44, 43, 290/54

(56) References Cited

U.S. PATENT DOCUMENTS

| | | | | |
|---|---|---|---|---|
| 4,039,848 A | * | 8/1977 | Winderl | 290/55 |
| 4,087,927 A | * | 5/1978 | Basmajian | 35/13 |
| 6,270,308 B1 | * | 8/2001 | Groppel | 415/4.3 |
| 6,476,513 B1 | * | 11/2002 | Gueorguiv | 290/55 |
| 2002/0192068 A1 | * | 12/2002 | Selsam | 415/3.1 |

* cited by examiner

Primary Examiner—Nicholas Ponomarenko
Assistant Examiner—Iraj A. Mohandesi
(74) Attorney, Agent, or Firm—Haynes and Boone, LLP

(57) ABSTRACT

Disclosed is a wind turbine generator, which effectively uses wind velocity while generating a minimum of noise. Two blade assemblies, which are subjected to natural wind velocity to rotate for driving a power generator, are coaxially mounted one behind the other. When the front end and rear blade assemblies in this configuration both catch a wind to rotate, the rear blade assembly rotates as it catches not only the wind that comes from the front and is rectified by the front blade assembly, but also a wind that is generated by the front blade assembly, which is rotating. This enables the rear blade assembly to rotate with high efficiency and continuously rotate even when the wind velocity is low.

18 Claims, 21 Drawing Sheets

Fig. 5
(a) 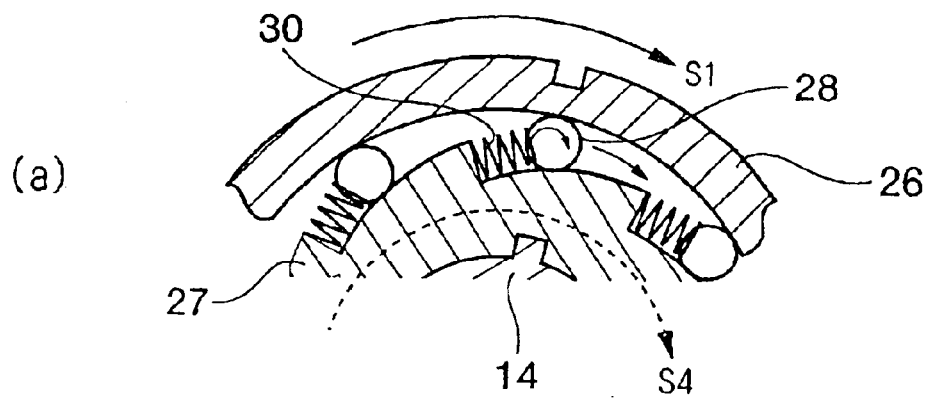
(b) 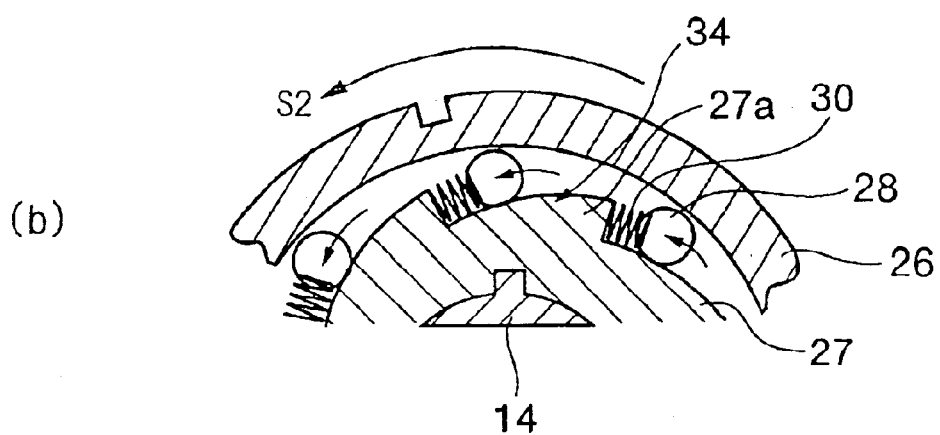
(c) 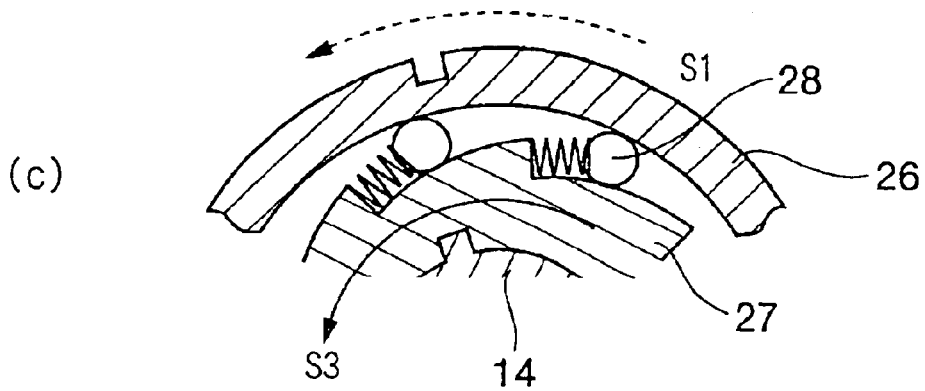

Fig. 7
WIND VELOCITY-GENERATED TORQUE
CHARACTERISTIC CURVE
(A) CONVENTIONAL CASE
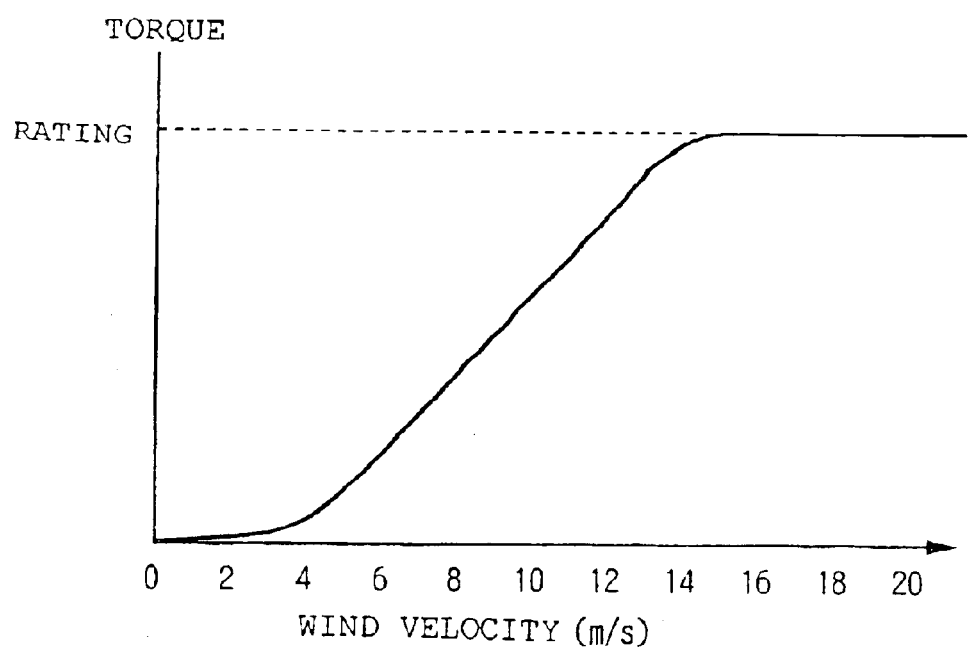
(B) CASE OF PRESENT INVENTION
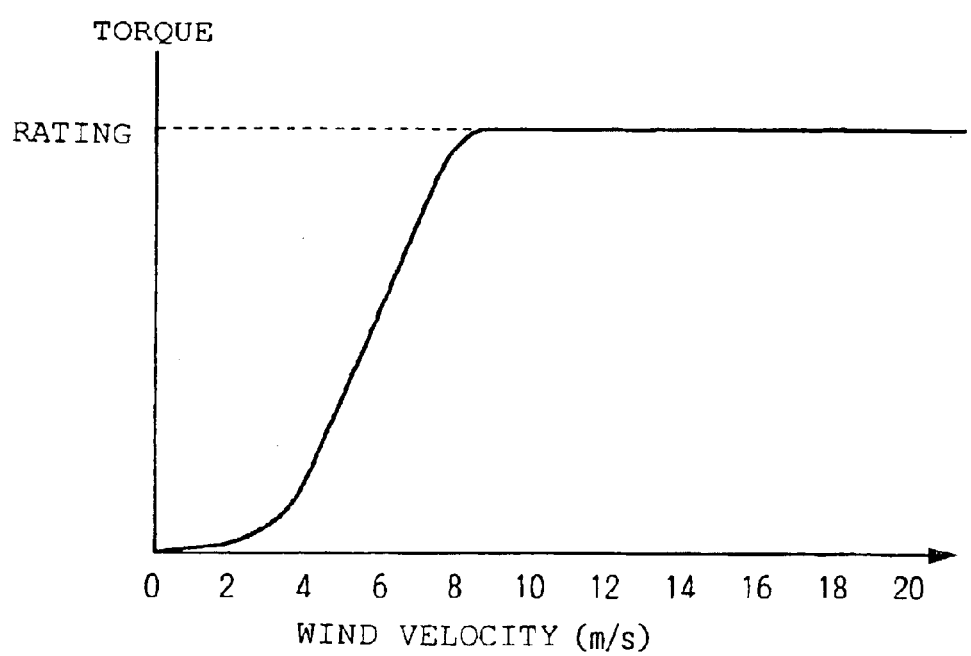

WIND TURBINE GENERATOR

BACKGROUND

The present invention relates to a wind turbine generator that uses the velocity of the natural wind to generate electricity, and more particularly to a wind turbine generator that is capable of using wind velocity with high efficiency.

Description of Prior Art

Wind turbine generators, which make use of natural wind velocity to generate electricity, use the velocity of the natural wind that is considered to exist semipermanently. They are now highlighted as a power generator that can be used in replacement of power generators that use petroleum, coal, or other limited resources for power generation purposes. Therefore, research and development activities are vigorously conducted concerning wind turbine generators, and efforts are being made to put them to practical use.

FIG. 1 is a schematic front view of a conventional wind turbine generator. In the wind turbine generator shown in FIG. 1, a wind turbine nacelle b, which incorporates a generator and other components, is mounted at the end of a tower a and free to rotate horizontally. At the end of the nacelle b, blades d are secured to a rotor shaft c in such a manner that the blades d rotate when they are subjected to natural wind velocity. The blades d are made, for instance, of an aluminum alloy plate or other lightweight material. Two, three, or more blades are used. When viewed from the front, the wind turbine generator shown in FIG. 1 is equipped with a blade assembly e, which comprises three blades d that are secured to the rotor shaft c and spaced at equal intervals of 120 degrees. A power transmission device is coupled to the rotor shaft c. A gearbox for speed ratio changeover and a power generator are connected to the power transmission device. The blade assembly e is directly coupled to the rotor shaft c. When the blade assembly e rotates, motive power is transmitted to the power generator (the power generator stops if the blade assembly stops rotating). When the blade assembly e is blown by the wind and rotates, motive power is transmitted to the directly-coupled power generator so that electrical power generation takes place.

FIGS. 7A and 7B are characteristic curves, which illustrate the relationship between the wind velocity and the torque generated by the blade assembly. FIG. 7A shows a conventional case, which corresponds to the above example. The characteristic curve shown in FIG. 7A indicates that the blade assembly rotating speed and the torque both increase when the wind velocity [meters per second (m/s)] gradually increases from zero. When the wind velocity builds up to 14 meters per second, the wind turbine generator torque rating (about 2100 kg-m in general) is reached. The torque does not increase any more even when the wind velocity further builds up. However, when a typhoon or other extremely strong wind blows, the blade assembly is positioned 90 degrees away from the direction of the wind by changing its orientation in the interest of structural safety. This safety precaution is taken to prevent the blade assembly and power transmission device from being damaged.

In the conventional wind turbine generator described above, however, motive power is received from a single blade assembly e for power generation purposes. It means that only the wind velocity portion received by the blade assembly e is transmitted to the power generator and used for electrical power generation.

Further, the blade assembly e is directly coupled to the rotor shaft c. Therefore, if the wind stops (the wind may blow hard, blow soft, or stops, causing an unexpected change in its velocity) after the blade assembly e starts rotating, the power generator attempts to continue rotating by the force of inertia. However, the blade assembly e resists to inhibit the power generator from rotating because it does not receive any wind-generated motive power. Since the blades d are approximately 10 or more meters long, such resistance (moment) is considerably great. Therefore, when the wind stops, the blade assembly e and power generator decrease their rotating speeds. When the wind blows subsequently, the blade assembly e rotates to transmit motive power to the power generator.

At present, the above conventional cycle of operation is repeated to generate electrical power with predetermined energy efficiency. However, the wind velocity-torque characteristic shown in FIG. 7A cannot efficiently use the wind energy for electrical power generation. In other words, the efficiency is not adequate and can be improved for better results.

In recent years, there has been a trend for individual households to install a power generator and use the installed power generator to meet the individual home power requirements instead of receiving electrical power from a conventional, major power company. It is expected that a solar power generator or a wind turbine generator will be used as a power generator for such an application. Especially, solar power generators are already installed and used at individual households. It should be noted, however, that solar power generators work during the daytime only and is not available during the nighttime. On the other hand, wind turbine generators can be used day and night as far as the wind blows. The use of wind turbine generators is extremely effective depending on their installation site. However, the wind noise generated by the blade assembly is now considered to be a problem. Therefore, the development of a wind turbine generator that does not generate any wind noise is now called for.

In consideration of the circumstances described above, it is a first object of the present invention to provide a wind turbine generator that is capable of generating electrical power by making efficient use of wind velocity.

A second object of the present invention is to provide a wind turbine generator that generates a minimum of noise.

SUMMARY OF THE INVENTION

The present invention has a plurality of blade assemblies that are installed over the same axis. When subjected to natural wind velocity, these blade assemblies rotate to drive a power generator. The blade assemblies are arranged in the front-to-rear direction in such a manner that they overlap with each other. When the front and rear blade assemblies within this configuration catch the wind and rotate, the rear blade assembly rotates as it catches the wind generated by the rotating front blade assembly in addition to the wind coming from the front. Particularly, the ends of the blades of the front blade assembly rotate at high peripheral velocity. Therefore, the wind blown rearward from these ends has high wind velocity. The rear blade assembly is subjected to such high wind velocity so that blade assembly rotation takes place with high efficiency. Further, when the front blade assembly rotates, the natural wind blowing toward the front blade assembly is pushed outward due to rectification. Therefore, the wind caught by the rear blade assembly is conditioned better the wind that is caught by the front blade assembly. The rear blade assembly catches the rectified wind and can use the wind velocity efficiently. As a result, blade assembly rotation takes place with high efficiency.

The wind turbine generator of the present invention comprises a power generator; a first blade assembly for being subjected to natural wind velocity to rotate and drive the power generator; a second blade assembly that is positioned behind the first blade assembly to overlap with the first blade assembly and subjected to the natural wind velocity to rotate for driving the power generator; and clutching means that are positioned between the first/second blade assemblies and the power generator to disengage the power generator from the first blade assembly and/or the second blade assembly to reduce the rotary load on the power generator when the first and second blade assemblies are loaded. When the first and second blade assemblies both catch the wind to rotate in a situation where the above configuration is employed, the second blade assembly, which is positioned rearward, rotates as it catches the wind generated by the rotating first blade assembly, which is positioned forward, in addition to the wind coming from the front. This results in an increase in the blade assembly rotation efficiency. If the wind velocity lowers to reduce the blade assembly rotating speed, the power transmission line between the blade assemblies and power generator disconnects so that the power generator can rotate for a long period of time while the rotary load is reduced for the power generator only. If, in the meantime, the wind velocity increases to raise the blade assembly rotating speed, the clutch locks so as to reconnect the power transmission line between the blade assemblies and power generator. Therefore, the blade assemblies accelerate the power generator and impart high torque to rotate it. As a result, the power generator can be efficiently driven.

The wind turbine generator of the present invention is configured so as to use a one-way clutch as clutching means. This clutch engages when the first blade assembly and/or the second blade assembly are about to rotate faster than the power generator. The use of this configuration makes it possible to automatically detect blade assembly rotation and control the clutching means.

Further, the wind turbine generator of the present invention is configured so that a plurality of blade assemblies, which catch the natural wind to rotate and drive the power generator, are installed over the same axis and arranged in the front-to-rear direction in an overlapping manner. More precisely, the blades of the blade assemblies are constantly positioned so that their angular positions do not coincide with each other. When the front and rear blade assemblies catch the wind to rotate within this configuration, the rear blade assembly rotates as it catches not only the wind coming from the front but also the wind generated by the front blade assembly which is rotating. Particularly, the ends of the blades of the front blade assembly rotate at high peripheral velocity. Therefore, the wind blown rearward from these ends has high wind velocity. The rear blade assembly is subjected to such high wind velocity so that blade assembly rotation takes place with high efficiency. Further, the relative rotary positions of the blades of front and rear blade assemblies are maintained within a predetermined angular range so that they do not coincide with each other during blade assembly rotation in the rotating direction. Therefore, the amount of wind noise generated by each blade assembly is reduced so that the resulting wind turbine generator generates a minimum of noise. More specifically, the wind coming into contact with the blades of the front blade assembly and generating wind noise is disturbed and deadened by the rotating blades of the rear blade assembly. Meanwhile, the wind coming into contact with the blades of the rear blade assembly is constantly disturbed by the rotating blades of the front blade assembly. Since the wind reaching the rear blade assembly is disturbed so as to reduce the strength of the wind, the amount of wind noise generated by the rear blade assembly is reduced. As a result, the total amount of wind noise is minimized.

Furthermore, the wind turbine generator of the present invention is configured so as to employ a lock bearing that maintains the relative rotary positions of the blades of the first and second blade assemblies within a predetermined angular range. When the first and second blade assemblies both catch the wind to rotate in this configuration, the second blade assembly, which is positioned rearward, rotates with higher efficiency that the first blade assembly. Therefore, when the second blade assembly attempts to rotate faster than the first blade assembly, the lock bearing works to keep the relative rotary positions of the blades of the first and second blade assemblies within a predetermined angular range. This not only prevents the output torque from being attenuated by the coincidence between the blades of the first and second blade assemblies, but also reduces the amount of wind noise. This results in a quiet wind turbine generator. In this configuration, the lock bearing prevents the blades of the first and second blade assemblies from coinciding with each other by keeping their relative rotary positions within a predetermined angular range. This configuration provides a quiet wind turbine generator in which the lock bearing maintains the relative rotary positions of the blades of the first and second blade assemblies within a predetermined angular range without allowing them to coinciding with each other. As an alternative method for preventing the blades of the first and second blade assemblies from coinciding with each other, magnets of the same polarity may be mounted respectively on the first and second blade assemblies and positioned so that they face each other when the blades of the first and second blade assemblies coincide with each other.

As described above, the wind turbine generator of the present invention has a plurality of blade assemblies that are installed over the same axis and arranged in the front-to-rear direction in an overlapping manner in order to catch the natural wind, rotate, and drive the power generator. This enables the wind turbine generator to obtain high blade assembly torque from wind velocity and generate electrical power with high efficiency. Consequently, the wind turbine generator of the present invention provides an extremely excellent advantage. While the minimum wind velocity required for effective operations of conventional wind turbine generators is 5 m/s (5 meters per second), the wind turbine generator of the present invention effectively operates even when the wind velocity is as low as 3 m/s or so. When the frequency with which the wind velocity prevalent at a certain site (or in a certain area) is 5 m/s or higher is compared against the frequency with which the wind velocity is 3 m/s or higher, it is obvious that the latter frequency is much higher than the former one. Therefore, the above-mentioned decrease in the minimum required wind velocity means a remarkable increase in the length of time during which the wind turbine generator operation is effective. It also indicates that the present invention makes it possible to install and operate an economically efficient wind turbine generator in any regions of the world where the wind blows (the wind velocity need not be high).

Conventionally, wind turbine generators were installed and operated only in a limited number of regions (e.g., plateaus near the seashore) where the wind blows at a velocity of 5 m/s or higher. However, the present invention urges a corporation, government agency, or any other organization that intends to use a wind turbine generator for energy supply purposes to conduct investigations concerning wind turbine generator installation.

BRIEF DESCRIPTION OF THE DRAWINGS

FIGS. 5A, 5B, and 5C illustrate the operations of a one-way clutch according to the first embodiment;

FIGS. 7A and 7B show wind turbine generator characteristic curves that illustrate the relationship between wind velocity and generated torque;

DESCRIPTION OF THE PREFERRED EMBODIMENTS

Figure 1:
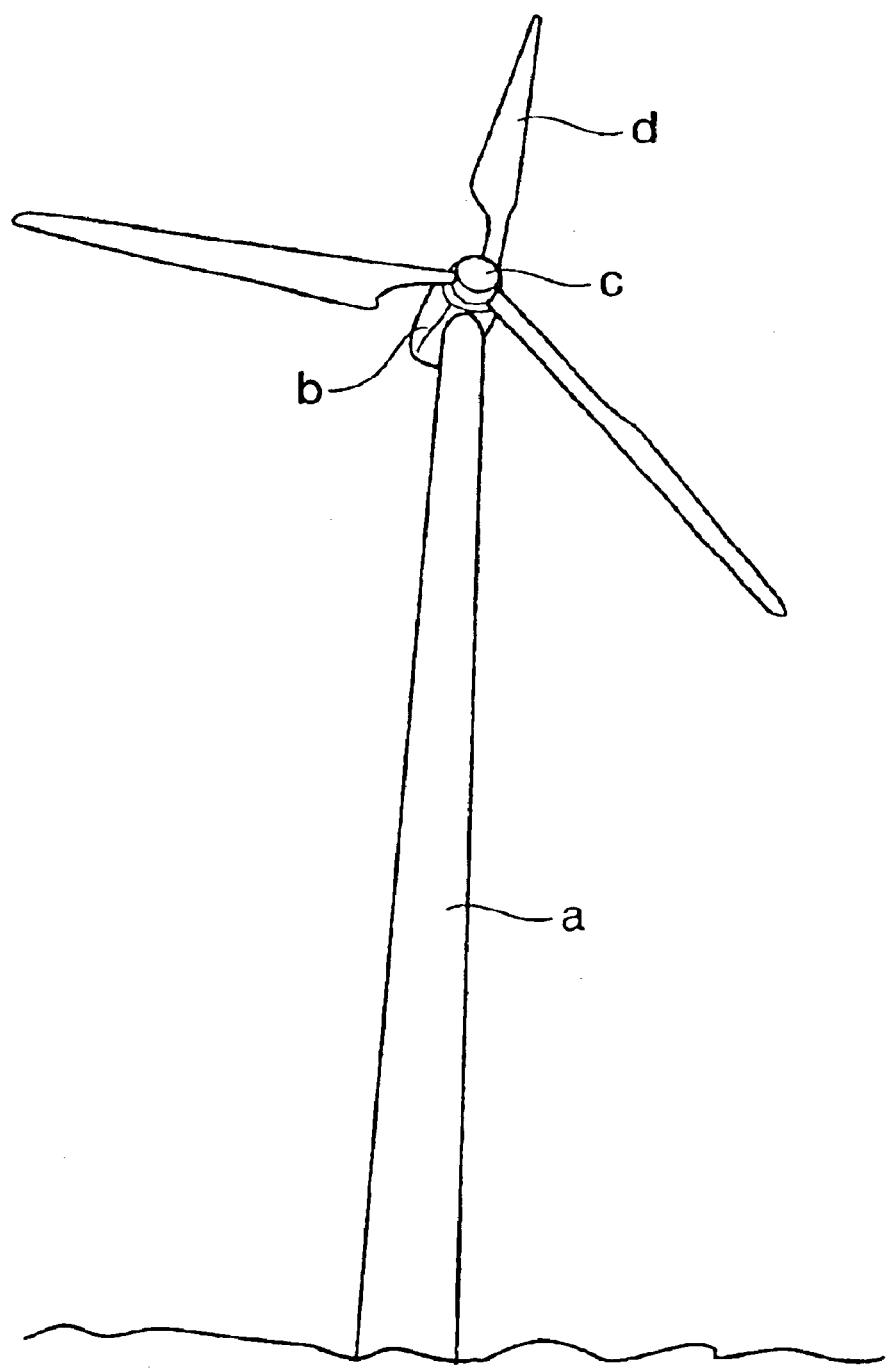
FIG. 1 is an external view of a conventional wind turbine generator.
Figure 6:
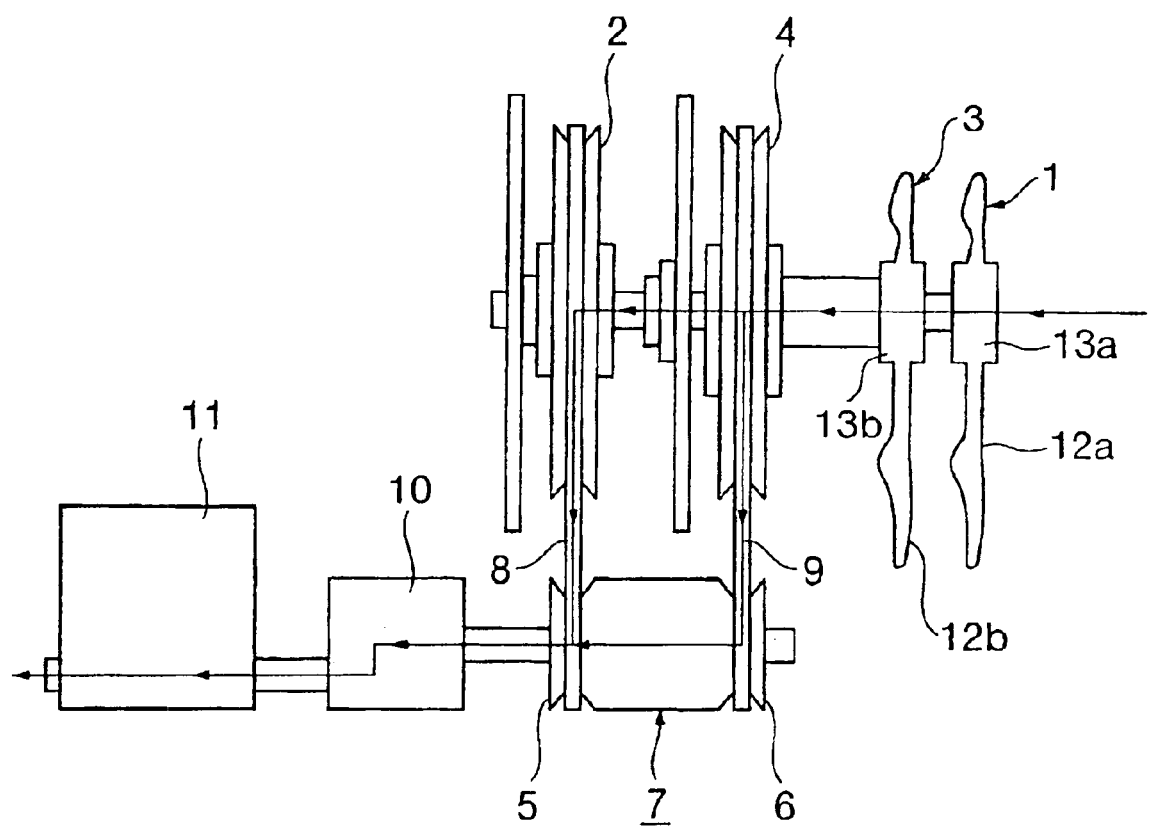
FIG. 6 is a schematic diagram illustrating the configuration of a wind turbine generator according to the first embodiment.

Preferred embodiments of a wind turbine generator according the present invention will now be described with reference to the accompanying drawings. FIG. 6 is a schematic diagram illustrating the configuration of a wind turbine generator according to the present invention. This figure shows a turbine section of the wind turbine generator, which corresponds to a nacelle b shown in FIG. 1. The wind turbine generator of the present invention has a first blade assembly 1, a first pulley 2, a second blade assembly 3, and a second pulley 4, which are on the same central axis. Further, a power transmission device 7, which has driven pulleys 5 and 6, is furnished. The driven pulleys 5 and 6 correspond to the first pulley 2 and second pulley 4, respectively. For motive power transmission purposes, endless belts 8 and 9 are used respectively to link the first pulley 2 to the driven pulley 5 and the second pulley 4 to a driven pulley 6. A gearbox 10, which changes the revolving speed ratio, and a power generator 11, which is rotated and driven upon receipt of converted motive power, are connected to the output end of the power transmission device 7. A one-way clutch, which is described later, is connected between the first blade assembly 1 and the first pulley 2 and/or between the second blade assembly 3 and the second pulley 4. When the one-way clutch engages/disengages, the first and second blade assemblies 1 and 3 rotate as one piece or independently. Under normal conditions, the first and second blade assemblies 1 and 3 rotate as one piece. When they rotate, its rotation is transmitted to the power transmission device 7 via the first and second pulleys 2, 4, the endless belts 8 and 9, and the driven pulleys 5 and 6. Further, the power transmission device 7 rotates the power generator 11 via the gearbox 10 for electrical power generation purposes.

The structure of the turbine section of the wind turbine generator will now be described in detail. For simplicity of explanation, the subsequent descriptions of all the embodiments assume that components not shown in the drawings of the wind turbine generator are the same as the counterparts shown in FIG. 6, and the same components are identified by the same reference numerals.

[First Embodiment]

Figure 2:
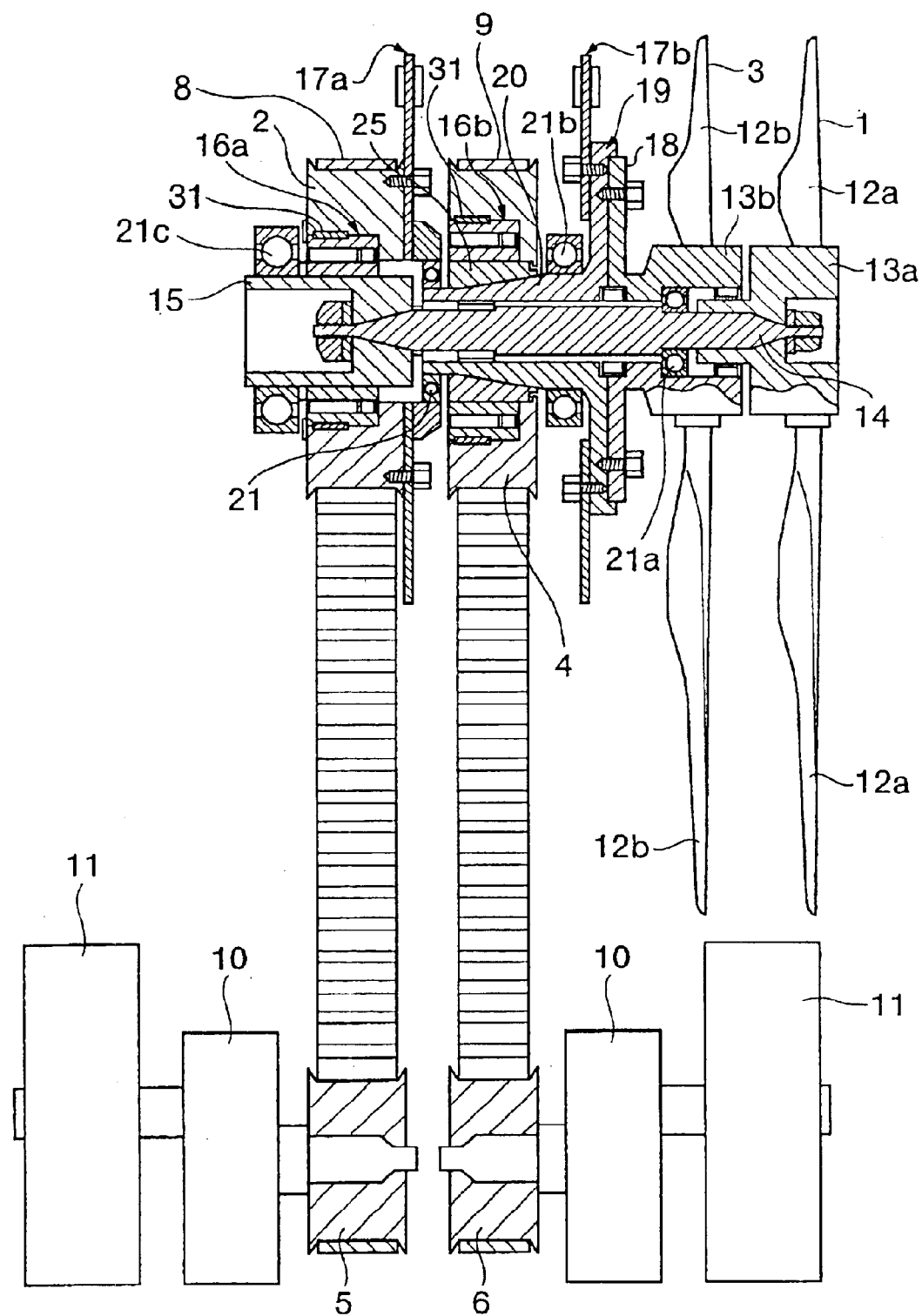
FIG. 2 is a vertical cross-sectional side view of a first embodiment of a wind turbine generator according to the present invention.
Figure 3:
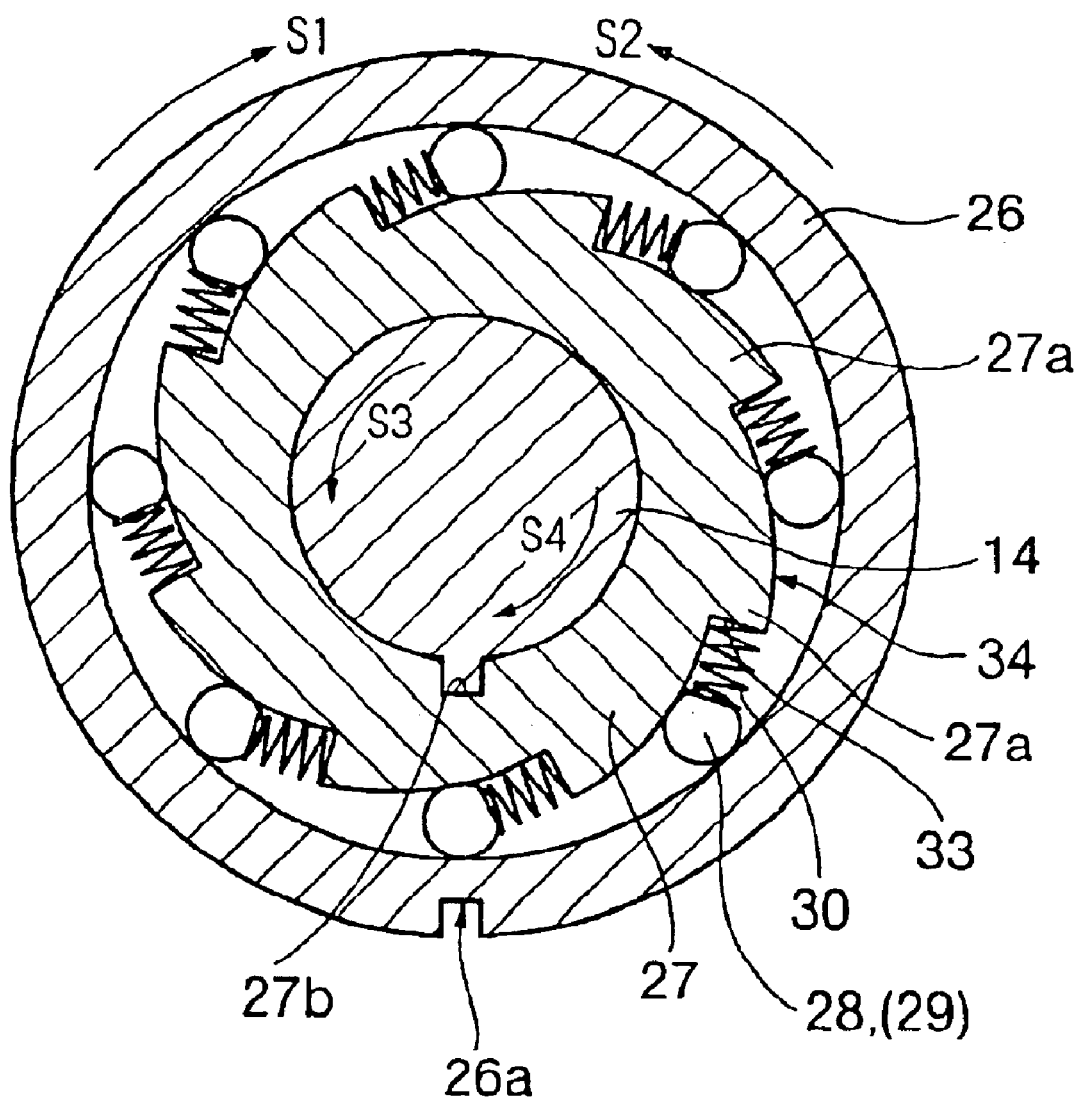
FIG. 3 is a cross-sectional view of a one-way clutch according to the first embodiment, which is obtained by a perpendicular cut through the central axis of the one-way clutch.
Figure 4:
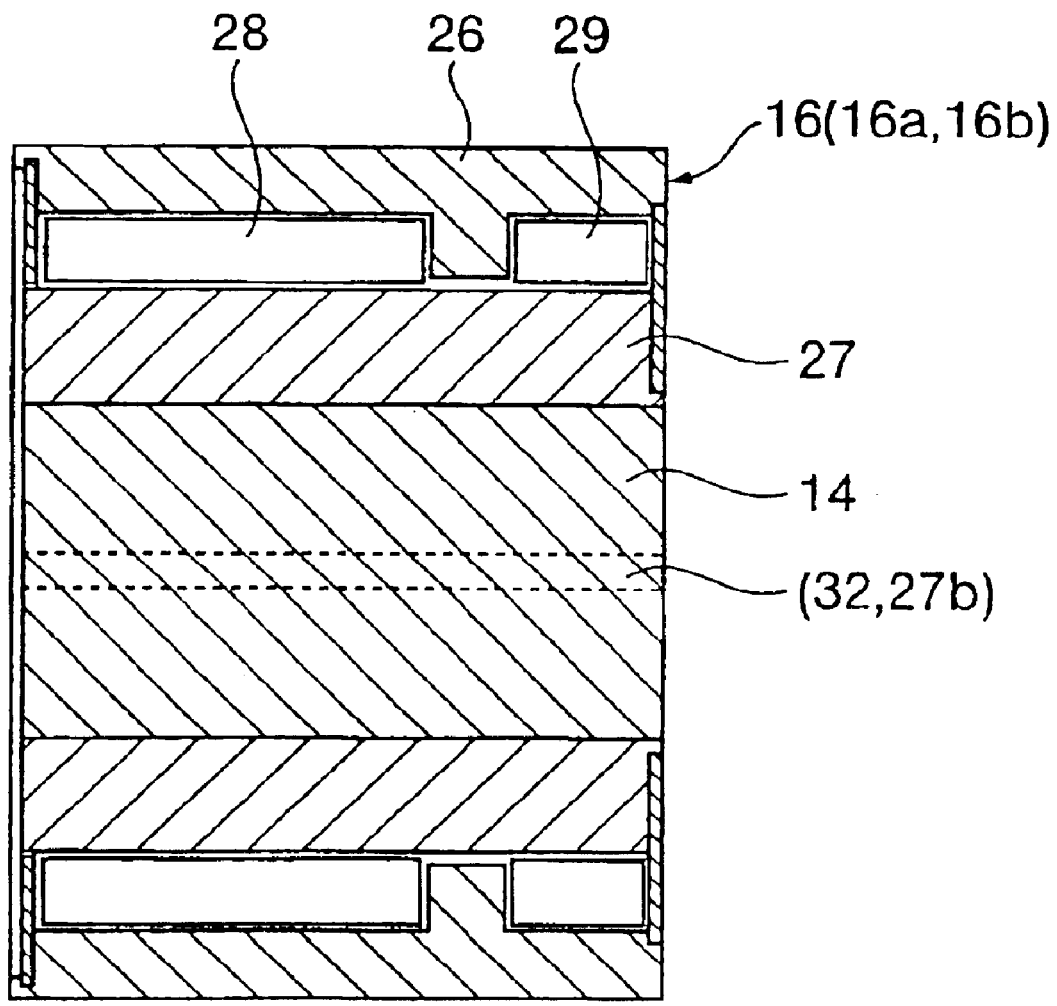
FIG. 4 is a cross-sectional view of a one-way clutch according to the first embodiment, which is obtained by a cut along the central axis of the one-way clutch.

FIGS. 2 through 4 show a first embodiment of a wind turbine generator according to the present invention. FIG. 2 is a vertical cross-sectional side view of the first embodiment of a wind turbine generator. FIG. 3 is a cross-sectional view of a one-way clutch according to the first embodiment, which is obtained by a perpendicular cut through the central axis of the one-way clutch. FIG. 4 is a cross-sectional view of the one-way clutch according to the first embodiment, which is obtained by a cut along the central axis of the one-way clutch. The first embodiment of the wind turbine generator is a two-axis type wind turbine generator. In the description set forth below, the term "two-axis type" refers to a system in which two blade assemblies (first blade assembly 1 and second blade assembly 3) independently rotate, have their own power transmission lines, and can basically drive their respective power generators. In some cases, however, the first blade assembly 1 and second blade assembly 3 may drive the same power generator (see an example in FIG. 6).

The wind turbine generator of the first embodiment includes two blade assemblies, which are substantially coaxial, that is, installed over substantially the same axis and arranged in the front-to-rear direction in an overlapping manner (so as to form a tandem structure comprising the first blade assembly 1 and second blade assembly 3). When viewed from the front, each of these blade assemblies 1, 3 has three blades 12a, 12b, which are fastened to a rotor shaft section and spaced at equal intervals of 120 degrees. The blades 12a of the first blade assembly 1 are somewhat shorter (by about several to ten percent) than the blades 12b of the second blade assembly 3.

More specifically, the first blade assembly 1 is coupled to a rotor shaft 14 via a hub 13a. An output shaft member 15 is mounted on the rearmost end of the rotor shaft 14 in such a manner that the output shaft member and the rotor shaft rotate as one piece. The first pulley 2 is mounted on the output shaft member 15. A one-way clutch 16a, which doubles as a bearing, is installed between the output shaft member 15 and the first pulley 2. A first disc brake 17a is mounted on the first pulley 2. The first disc brake 17a brakes the first blade assembly 1 if it is about to rotate in the reverse direction due to the direction of the wind. The normal direction of rotation is predefined for both the first and second blade assemblies. If they are about to rotate in the reverse direction, they are braked to avoid their reverse rotation.

The second blade assembly 3 is mounted on a hub 13b. A sleeve member 20, which is combined with flanges 18, 19, is linked to the hub 13b. The hub 13b and sleeve member 20 each have a though-hole at the center. This through-hole is larger in diameter than the rotor shaft 14. The rotor shaft 14 is positioned within the through-hole. The hub 13b and sleeve number 20 are connected to the rotor shaft 14 with bearings 21 placed among the hub 13b, sleeve member 20, and rotor shaft 14. Since the bearings 21 are installed in the above manner, the hub 13b, sleeve member 20, and rotor shaft 14 can rotate independently of each other. A ring member 25 is mounted on the rearmost end of the sleeve member 20. The second pulley 4 is mounted on the ring member 25. A one-way clutch 16b, which doubles as a bearing, is installed between the ring member 25 and the second pulley 4. Further, a second disc brake 17b is mounted on a flange 19 for the sleeve member 20. As is the case with the first disc brake 17a, the second disc brake is capable of braking the second blade assembly 3 when it is about to rotate in the reverse direction.

The one-way clutch 16a, which is provided for side 1 of the first blade assembly, is similar in structure to one-way clutch 16b, which is provided for side 2 of the first blade assembly, except that the one-way clutch 16a is installed between the output shaft member 15 and first pulley 3 whereas the one-way clutch 16b is installed between the ring member 25 and second pulley 4. FIGS. 3 and 4 illustrate the structures of one-way clutches 16a and 16b. FIG. 3 is a cross-sectional view of the one-way clutch 16a/16b, which is obtained by a perpendicular cut through the central axis of the one-way clutch. FIG. 4 is a cross-sectional view of the one-way clutch 16a/16b, which is obtained by a cut along the central axis of the one-way clutch. As indicated in FIGS. 3 and 4, the one-way clutches 16a and 16b comprise an outer shaft 26 which has a cylindrical cross section, a center shaft 27 which is positioned within the cylinder of the outer shaft 26 and also has a cylindrical cross section, rollers 28, 29 which are positioned between the outer shaft 26 and center shaft 27, and a spring 30. A keyway 26a is formed in the outer circumferential surface of the outer shaft 26 in such a manner that it is continuously extended along the central axis (in the same direction as the axis). The outer shaft 26, first pulley 2, and second pulley 4 rotate as one piece because a key 31, which is provided each on the first pulley 2 and second pulley 3, engages with the keyway 26a in the outer shaft 26. The center shaft 27 has a substantially circular, basic cross-sectional structure. Its outer circumferential surface has a plurality of saw-toothed claws 27a, which are spaced at equal intervals. A keyway 27b is formed in its inner circumferential surface in such a manner that it is continuously extended along the central axis. Each claw 27a has a step 33 and a slope 34. The step 33 is cut at substantially right angles to the inside of the radial direction of the center shaft 27. The slope 34 continuously descends from a vertex of the step 33 to a valley of the adjacent step 33. The spring 30 is a coiled spring. One end of the spring 30 is attached to a claw 27a and the other end is projected toward the vertex of the slope 34 and placed on the slope 34. The rollers 28 and 29 are arranged along the central axis of the center shaft 27 and positioned on the slope 34. Further, the rollers are thrust by the spring 30 toward the vertex of the slope 34 and retained as it is gently sandwiched between the slope 34 and outer shaft of 26.

FIGS. 5A, 5B, and 5C illustrate the operations of one-way clutches 16a and 16b. The operations of one-way clutches 16a and 16b will now be described with reference to FIGS. 5A, 5B, and 5C. If it is assumed that the outer shaft 26 is on the driving side whereas the center shaft 27 is on the driven side, the rollers 28 and 29 move in the direction of arrow S1 in FIG. 3 due to their friction with the outer shaft 26 and enter a narrow gap between the slope 34 and the outer shaft 26 when the outer shaft 26 rotates in the direction of arrow S1. When the rollers are caught in the narrow gap, one-way clutches 16a and 16b lock so that the outer shaft 26 and center shaft 27 rotate in the direction of arrow S1 as one piece. The resulting locked state is shown in FIG. 5A. Immediately before the outer shaft 26 reverses in the direction of arrow S2 in FIG. 3, rollers 28 and 29 are caught between the outer shaft 26 and the slope 34. However, when the outer shaft 26 begins to rotate in the reverse direction, the rollers 28 and 29 move in the direction of arrow S2 due to their friction with the outer shaft 26 and are pushed toward a large gap between the slope 34 and the outer shaft 26 as shown in FIG. 5B. Therefore, the motive power transmission link between the rollers 28 and 29 and outer shaft 26 is disconnected. In other words, the one-way clutches 16a and 16b unlock to separate the outer shaft 26 from the center shaft 27 so that idling starts.

If, on the other hand, the center shaft 27 is on the driving side whereas the outer shaft 26 is on the driven side, the rollers 28 and 29 move in the direction of arrow S3 in FIG. 3 due to their friction with the center shaft 27 (slope 34) and enter a narrow gap between the slope 34 and the outer shaft 26 when the center shaft 27 rotates in the direction of arrow S3. When the rollers are caught in the narrow gap, the one-way clutches lock so that the outer shaft 26 and center shaft 27 rotate in the direction of arrow S3 as one piece. The resulting locked state is shown in FIG. 5C. Immediately before the center shaft 27 reverses in the direction of arrow S4 in FIG. 3, the rollers 28 and 29 are caught between the outer shaft 26 and the slope 34. However, when the center shaft 27 begins to rotate in the reverse direction, the rollers 28 and 29 move in the direction of arrow S4 due to their friction with the center shaft 27 (slope 34) and are pushed toward a large gap between the slope 34 and the outer shaft 26 as shown in FIG. 5B. Therefore, the motive power transmission link between the rollers 28 and 29 and the slope 34 is disconnected. In other words, one-way clutches 16a and 16b unlock to separate the outer shaft 26 from the center shaft 27 so that idling starts.

The operation of the first embodiment of the wind turbine generator, which is configured as described above, will now be described. For explanation purposes, it is assumed that the wind blows from the right-hand side of FIG. 2. As a basic operation, the first blade assembly 1 and second blade assembly 3 catch the wind and rotate. The rotation of the first blade assembly 1 is transmitted to the first pulley 2 via the hub 13a, rotor shaft 14, output member 15, and one-way clutch 16a. The first pulley 2 then transmits the rotation to the driven pulley 5 via the endless belt 8 so as to drive the power generator 11. The rotation of the second blade assembly 3 is transmitted to the second pulley 4 via the hub 13b, sleeve member 20, ring member 25, and one-way clutch 16b. The second pulley 4 then transmits the rotation to the driven pulley 6 via the endless belt 9 so as to drive the power generator 11.

When the one-way clutches 16a and 16b are noted in this instance, the rotor shaft 14 and sleeve member 20, which are the members for the driving side, both rotate together with the center shaft 27 shown in FIG. 3 as one piece. Therefore, the center shaft 27, which is integral with the rotor shaft 14 and sleeve member 25, is on the driving side. On the other hand, the first pulley 2 and second pulley 4, which are the members of the one-way clutches 16a and 16b for the driven side, both rotate together with the outer shaft 26 shown in FIG. 3 as one piece. Therefore, the outer shaft 26, which is integral with the first pulley 2 and second pulley 4, is on the driven side. Due to the above driving/driven component relationship, the rotor shaft 14 and sleeve member 20 rotate in the direction of arrow S3 in FIG. 3 to drive the power generator 11. The first blade assembly 1 and second blade assembly 3 rotate in accordance with the wind velocity. The higher the wind velocity, the higher the rotating speed and thus the higher the generated torque.

The operation performed if the wind velocity later decreases (or stops) will now be described. When the wind velocity lowers, the center shaft 27 in the one-way clutches 16a and 16b shut off the supply of force in the direction of arrow S3 in FIG. 3; however, the first blade assembly 1 and second blade assembly 3 both continue rotating by the force of inertia for a certain period of time. The first blade assembly 1 and second blade assembly 3 soon begin to decelerate due to significant torque braking by the blades 12a and 12b. As a result, the outer shaft 26 on the driven side begins to rotate faster than the center shaft 27, thereby unlocking the one-way clutches 16a and 16b. Thus, the resistance of the first blade assembly 1 and second blade assembly 3 is not transmitted to the power generator 11 so that the power generator 11 can continue to rotate for a period of longer than before. If, sooner or later, the wind velocity increases, the first blade assembly 1 and second blade assembly 3 start rotating again to accelerate the power generator 11, which is more or less decelerated, and impart high torque to it.

The interaction between the first blade assembly 1 and second blade assembly 3, which are both rotating, will now be described. The first blade assembly 1 and second blade assembly 3 both catch the wind and rotate. However, the second blade assembly 3 catches not only the wind coming from the front but also the wind generated by the first blade assembly 1, which is rotating. Particularly, the ends of the blades 12a of the first blade assembly (each blade may be as long as 40 meters or so) rotate at high peripheral velocity. Therefore, the wind forcibly blown rearward from these ends has high wind velocity. If the blades 12a of the first blade assembly 1 are set to be slightly longer than the blades 12a of the second blade assembly 3, the second blade assembly catches not only the natural wind but also the strong wind that is generated and thrust rearward from the ends of the blades 12a of the first blade assembly 1. Therefore, the second blade assembly 3 generates increased torque. Further, when the first blade assembly 1 rotates, the turbulent (natural) wind blowing toward the first blade assembly 1 is rectified by the first blade assembly 1. The rectified wind is then pushed rearward from the first blade assembly 1. The pushed wind then reaches the second blade assembly 3. Thus, the wind caught by the second blade assembly 3 is conditioned better than that is caught by the first blade assembly 1. As a result, when the first blade assembly 1 and second blade assembly 3 are allowed to catch the normal wind and rotate, the second blade assembly 3 rotates faster than the first blade assembly 1 so that the blades 12b of the second blade assembly rotate ahead of the blades 12a of the first blade assembly. In this respect, too, the second blade assembly 3 rotates more strongly than the first blade assembly, thereby generating higher torque.

In the first embodiment of the wind turbine generator, which is configured as described above, the one-way clutches 16a and 16b separate the first blade assembly 1 and second blade assembly 3 from the power generator 11 as described above, and the interaction between the first blade assembly 1 and second blade assembly 3 reduces the load that could obstruct the rotation of the power generator 11, and makes it possible to efficiently extract the energy of the wind, even when it blows soft. In a conventional wind turbine generator, for example, the power generator 11 does not effectively operate until the wind velocity builds up to approximately 5 m/s. In the first embodiment of the present invention, however, the power generator 11 effectively operates when the wind velocity is as low as 3 m/s or so. The first embodiment also enables the power generator 11 to continue operating for a long period of time even when the wind velocity lowers.

In the first embodiment, the relationship between the wind velocity and the torque generated by the blade assemblies is indicated by a characteristic curve shown in FIG. 7B. The characteristic curve shown in FIG. 7B indicates that when the wind velocity gradually increases from zero, the rotating speeds of the first blade assembly 1 and second blade assembly 3 increase, causing an increase in torque. This also holds true for conventional wind turbine generators. However, the first embodiment provides a greater torque increase (increase rate) than conventional wind turbine generators. Further, the first embodiment reaches the wind turbine generator's torque rating when the wind velocity is approximately 8 m/s.

The structure disclosed as the first embodiment, in which a two-axis system is employed, is such that the first blade assembly 1 and second blade assembly 3 drive their respective power generators 11. As shown in FIG. 6, however, a common power generator 11 may alternatively be provided for the first blade assembly 1 and second blade assembly 3 and driven by the first blade assembly 1 and second blade assembly 3.

[Second Embodiment]

Figure 8:
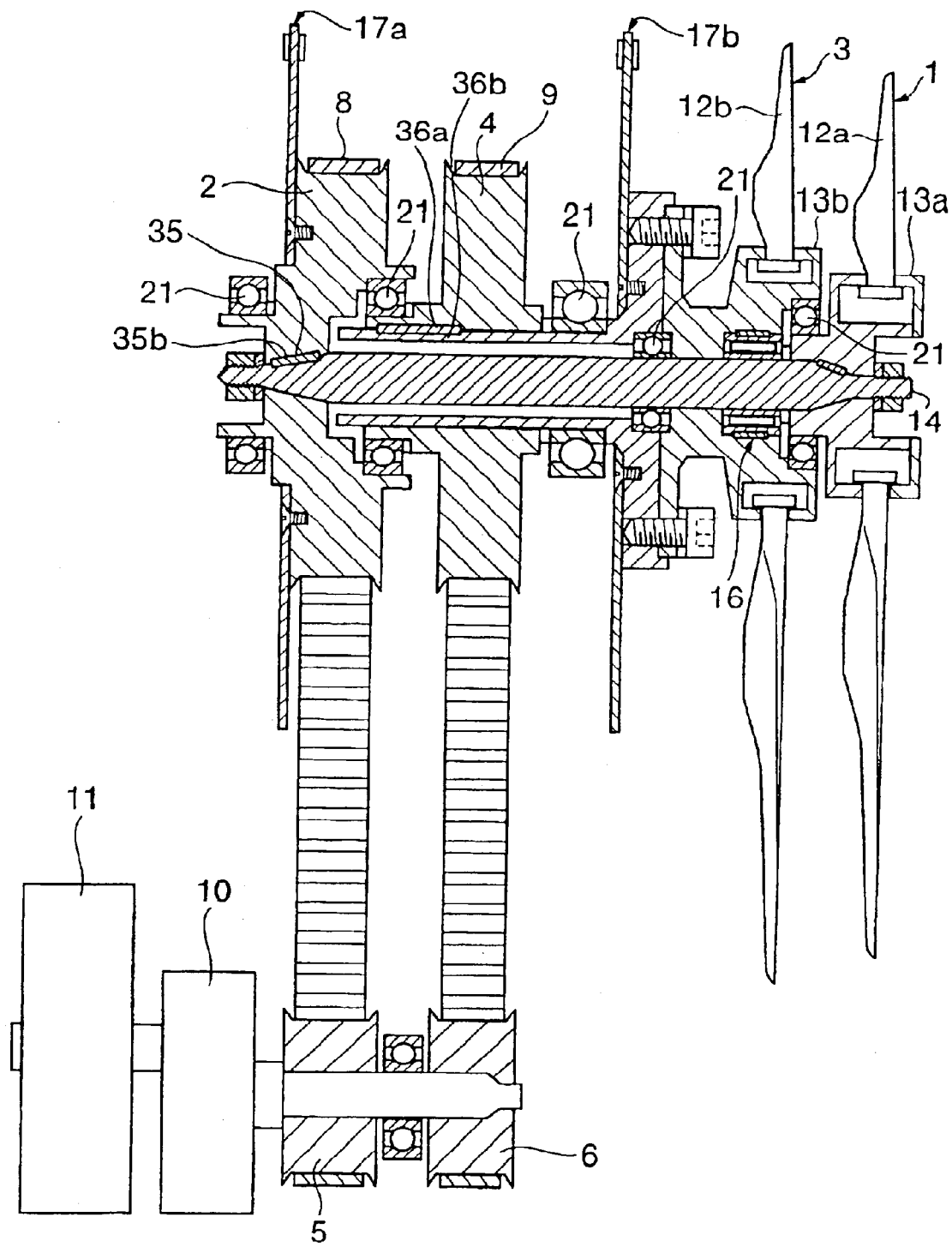
FIG. 8 is a vertical cross-sectional side view of a second embodiment of a wind turbine generator according to the present invention.

A second embodiment of a wind turbine generator according to the present invention will now be described with reference to FIG. 8. As is the case with the first embodiment, the second embodiment of the wind turbine generator is a two-axis type wind turbine generator. Components shown in FIG. 8 and identical with the counterparts of the first embodiment of the wind turbine generator, which are shown in FIGS. 2 to 5, are assigned the same reference numerals as their counterparts and will not be described again. In the wind turbine generator shown in FIG. 8, the rotor shaft 14 coupled to the first blade assembly 1 is directly coupled to the first pulley 2 because a key 35a secured to the rotor shaft 14 is engaged with a keyway 35b provided in the first pulley 2. The sleeve member 20 secured to the second blade assembly 3 is directly coupled to the second pulley 4 because a key 36a fastened to the sleeve member 20 engages with a keyway 36b. Further, a one-way clutch 16 is provided relative to the rotor shaft 14 of the first blade assembly 1 and the hub 13b of the second blade assembly 3, respectively. This one-way clutch 16 has the same structure as the one-way clutches (16a and 16b) that are described in conjunction with the first embodiment. In the description of the second embodiment, therefore, the structure of the one-way clutch 16 will not be described again in detail. However, the components of the one-way clutch 16 are described with reference numerals assigned in order to indicate the correlation with a structure shown in FIGS. 3 to 5. Therefore, the drawings used to describe the second embodiment do not duplicately show the structure of the one-way clutch 16. However, it should be understood that the one-way clutch 16 structured as shown in FIGS. 3 to 5 exists in a location where the presence of the one-way clutch 16 as indicated. In the second embodiment of the wind turbine generator, the rotor shaft 14 is coupled to the center shaft 27 by a key 32 and the keyway 27b, and the outer shaft 26 is coupled to the hub 13b by a key 31 and the keyway 27b.

The operation of the second embodiment of the wind turbine generator, which is configured as described above, will now be described. As a basic operation that is performed when the wind blows from the right-hand side of FIG. 8, the first blade assembly 1, which is directly coupled to the rotor shaft 14 via the hub 13a, and the second blade assembly 3, which is installed over the rotor shaft 14 via the hub 13b in a rotatable manner, both catch the wind and rotate. While the blade assemblies rotate in the normal direction, the rotation of the first blade assembly 1 is transmitted to the first pulley 2 via the hub 13a, rotor shaft 14, key 35a, and keyway 35b. This rotation is further transmitted from the first pulley 2 to the driven pulley 5 via the endless belt 8 to drive the power generator 11. The rotation of the second blade assembly 3 is transmitted to the second pulley 4 via the hub 13b, sleeve member 20, key 36a, and keyway 36b. This rotation is further transmitted from the second pulley 4 to the driven pulley 6 via the endless belt 9 to drive the power generator 11. Two units of the power generator 11 may be used: one is to be driven by the first blade assembly and the other is to be driven by the second blade assembly. Alternatively, a single unit of the power generator 11 may be furnished and driven by both the first blade assembly 1 and second blade assembly 3.

The basic operation of the one-way clutch 16, which is performed with the configuration for the second embodiment, will now be described. When the first blade assembly 1 and second blade assembly 3 rotate in the normal direction, the one-way clutch 16 is locked so that the rotor shaft 14 and the hub 13b rotate as one piece, and that the first blade assembly 1 and second blade assembly 3 use a directly-coupled structure to respectively transmit motive power to the power generator 11. The first blade assembly 1 and second blade assembly 3 rotate in accordance with the wind velocity. The higher the wind velocity, the higher the rotating speed and thus the higher the generated torque. The relationship between the first blade assembly 1 and second blade assembly 3 is such that the second blade assembly 3 occasionally rotates faster than the first blade assembly 1. This difference in the rotating speed repeatedly arises. More specifically, when the wind velocity lowers, the one-way clutch 16 stops supplying force to the center shaft 27, but the first blade assembly 1 and second blade assembly 3 both continue rotating for a while by the force of inertia. The first blade assembly 1 and second blade assembly 3 soon begin to decelerate due to significant torque braking by blades 12a and 12b. As a result, the outer shaft 26 begins to rotate at a relatively high speed and unlocks the one-way clutch 16. Thus, the resistance of the second blade assembly 3 (load element) is not transmitted to the power generator 11 so that only the first blade assembly 1 is connected to the power generator 11. Therefore, the power generator 11 can be rotated for a long period of time with the resistance reduced. If, sooner or later, the wind velocity increases, the first blade assembly 1 and second blade assembly 3 start rotating again to accelerate the power generator 11, which is more or less decelerated, and impart high torque to it.

Therefore, the second embodiment of the wind turbine generator, which is configured as described above, causes the one-way clutch 16 to separate the second blade assembly 3 from the power generator 11 and lets the first blade assembly 1 and second blade assembly 3 interact with each other to reduce the load that would inhibit the power generator 11 from rotating, thereby making it possible to extract the energy of the wind with high efficiency even when the wind is blowing soft.

[Third Embodiment]

Figure 9:
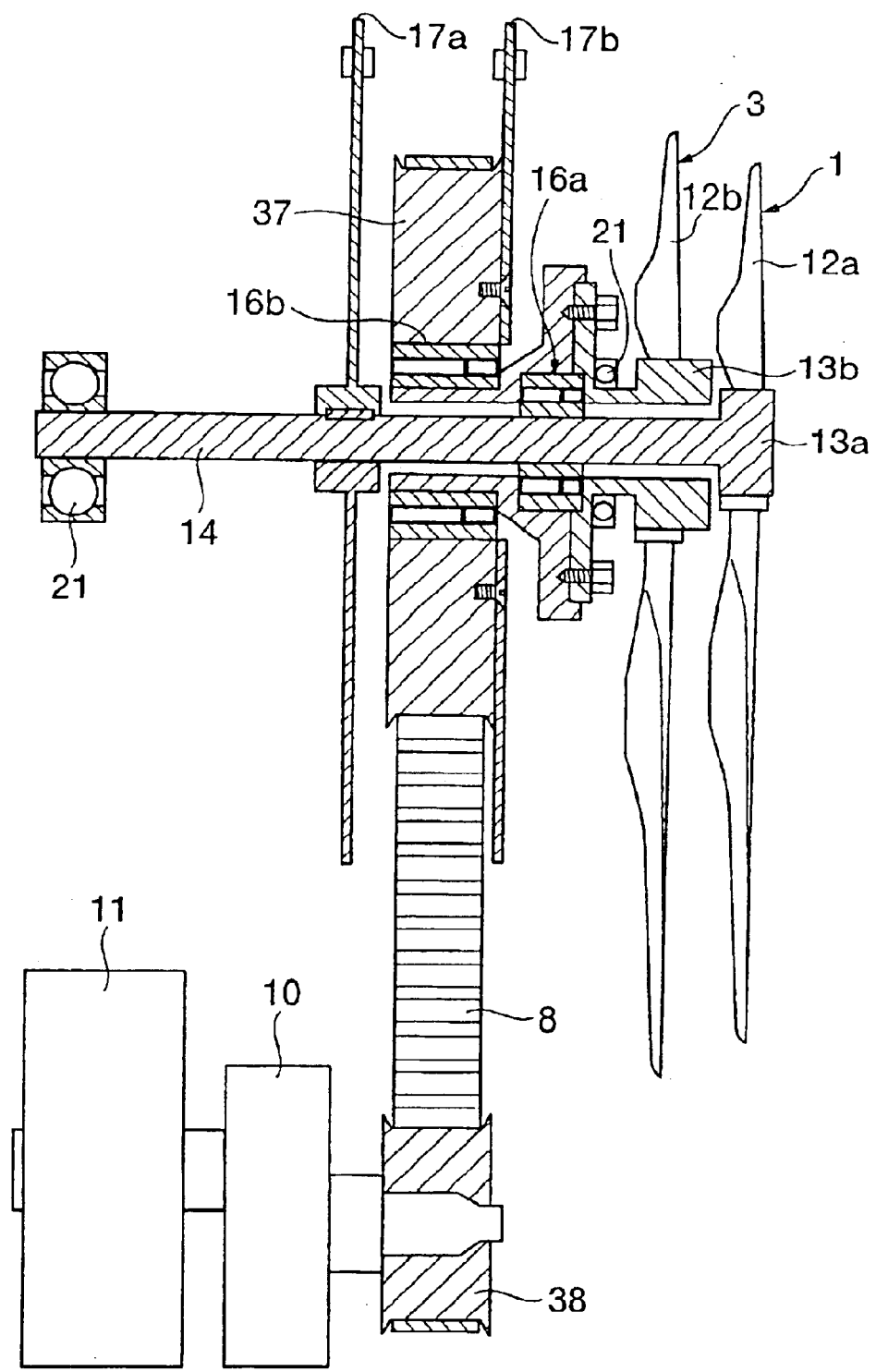
FIG. 9 is a vertical cross-sectional side view of a third embodiment of a wind turbine generator according to the present invention.

A third embodiment of a wind turbine generator according to the present invention will now be described with reference to FIG. 9. The third embodiment of the wind turbine generator is a one-axis type wind turbine generator. In the description set forth below, the term "one-axis type" refers to a system in which the outputs of two blade assemblies are both entered into a single motive power transmission system and transmitted to a driving pulley 37 and a driven pulley 38 for driving one power generator. Components shown in FIG. 9 and identical with the counterparts of the first and second embodiments of the wind turbine generator, which are shown in FIGS. 2 to 8, are assigned the same reference numerals as their counterparts and will not be described again. In the wind turbine generator shown in FIG. 9, the one-way clutch 16a is installed between the rotor shaft 14 for the first blade assembly 1 and the sleeve member 20 for the second blade assembly 3, whereas the one-way clutch 16b is installed between the sleeve member 20 and pulley 37 for the second blade assembly 3. These one-way clutches 16a, 16b are structured the same as the one-way clutches 16a, 16b that are described in conjunction with the first embodiment. In the description of the third embodiment, therefore, the structure of the one-way clutches 16a and 16b will not be described again in detail. However, the components of the one-way clutches 16a and 16b are described with reference numerals assigned in order to indicate the correlation with a structure shown in FIGS. 3 to 5. Therefore, the drawings used to describe the third embodiment do not duplicately show the structure of the one-way clutches 16a and 16b. However, it should be understood that the one-way clutch 16 structured as shown in FIGS. 3 to 5 exists in a location where the presence of the one-way clutch 16a or 16b is indicated. As regards the one-way clutch 16a, the center shaft 27, which is on the driving side, is coupled to the rotor shaft 14 by key 32 and keyway 27b in such a manner that the two shafts can rotate as one piece, whereas the outer shaft 26, which is on the driven side, is coupled to the hub 13b by key 32 and keyway 27b in such a manner that the outer shaft 26 and the hub 13b can rotate as one piece. As regards the one-way clutch 16b, on the other hand, the center shaft 27, which is on the driving side, is coupled to the hub 13b by the key 32 and keyway 27b in such a manner that the center shaft 27 and the hub 13b can rotate as one piece, where as the outer shaft 26, which is on the driven side, is coupled to the pulley 37 by the key 32 and keyway 27b in such a manner that the outer shaft 26 and pulley 37 can rotate as one piece.

The operation of the third embodiment of the wind turbine generator, which is configured as described above, will now be described. As a basic operation that is performed when the wind blows from the right-hand side of FIG. 9, the first blade assembly 1, which is directly coupled to the rotor shaft 14 via the hub 13a, and the second blade assembly 3, which is installed over the pulley 37 via the hub 13b in a rotatable manner, both catch the wind and rotate in the normal direction. While the blade assemblies rotate in the normal direction, the rotation of the first blade assembly 1 is transmitted to the pulley 37 via the hub 13a, rotor shaft 14, one-way clutch 16a, hub 13b, and second one-way clutch 16b. This rotation is further transmitted from the pulley 37 to the driven pulley 38 via the endless belt 8 to drive the power generator 11. The rotation of the second blade assembly 3 is transmitted to pulley 37 via the hub 13b and the second one-way clutch 16b. This rotation is further transmitted from the pulley 37 to the driven pulley 38 via the endless belt 8 to drive the power generator 11. In other words, the first blade assembly 1 and second blade assembly 3 rotate as one piece and use a directly-coupled structure under normal conditions to respectively transmit motive power to the power generator 11.

If the wind velocity lowers later, the first blade assembly 1 and second blade assembly 3 both continue rotating for a while by the force of inertia. The first blade assembly 1 and second blade assembly 3 soon begin to decelerate due to significant torque braking by blades 12a and 12b. Meanwhile, the power generator 11 attempts to continue rotating by the force of inertia. Therefore, a load arises between the first blade assembly 1 and second blade assembly 3 to unlock one-way clutch 16b. The power generator 11 then continues rotating under reduced load conditions. In the first blade assembly 1/second blade assembly 3 section, a load arises between the first blade assembly 1 and second blade assembly 3 so that the one-way clutch 16a unlocks. As a result, the second blade assembly 3 continues rotating under reduced load conditions. In other words, the one-way clutches 16a and 16b unlock in order from 16b to 16a. This prevents the resistance of the first blade assembly 1 and second blade assembly 3 from being transmitted to the power generator 11, allowing the power generator 11 to rotate for an increased period of time. If, sooner or later, the wind velocity increases, the one-way clutches 16a and 16b lock in order named, causing the first blade assembly 1 and second blade assembly 3 to start rotating again. The one-way clutches 16a and 16b are then disengaged so as to accelerate the power generator 11, which is more or less decelerated, and impart high torque to it.

Consequently, the third embodiment of the wind turbine generator, which is configured as described above, causes the one-way clutches 16a and 16b to separate the first blade assembly 1 and the second blade assembly 3 from the power generator 11 and lets the first blade assembly 1 and second blade assembly 3 interact with each other to reduce the load that would inhibit the power generator 11 from rotating, thereby making it possible to extract the energy of the wind with high efficiency even when the wind is blowing soft.

[Fourth Embodiment]

Figure 10:
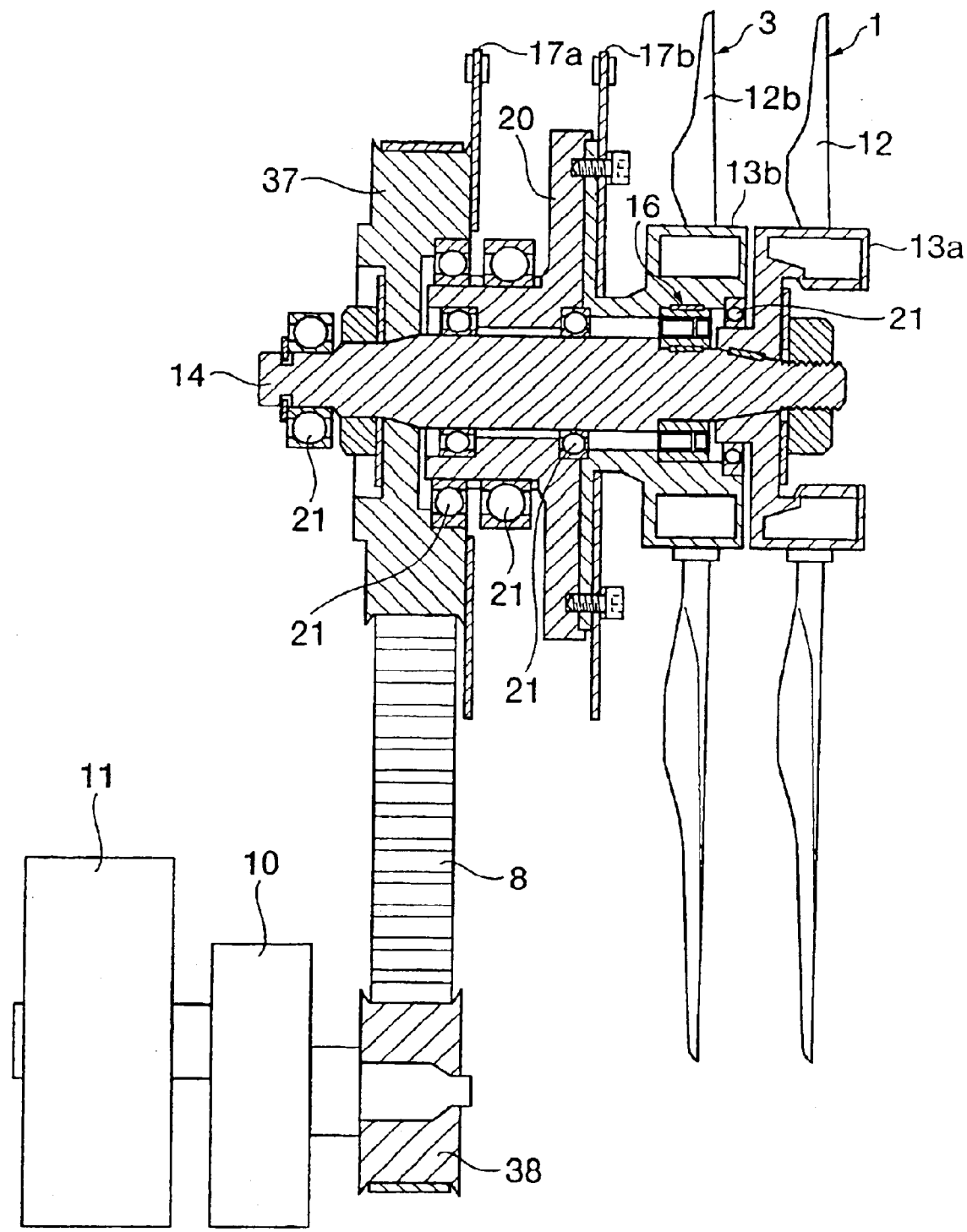
FIG. 10 is a vertical cross-sectional side view of a fourth embodiment of a wind turbine generator according to the present invention.

A fourth embodiment of a wind turbine generator according to the present invention will now be described with reference to FIG. 10. The fourth embodiment of the wind turbine generator is also a one-axis type wind turbine generator. Components shown in FIG. 10 and identical with the counterparts of the first to third embodiments of the wind turbine generator, which are shown in FIGS. 2 to 9, are assigned the same reference numerals as their counterparts and will not be described again. In the wind turbine generator shown in FIG. 10, a key 39a attached to the rotor shaft 14 is engaged with a keyway 39b provided in the hub 13a to mount the first blade assembly 1 at a front lateral end of the rotor shaft 14 in such a manner that the rotor shaft 14 and first blade assembly 1 rotate as one piece, whereas a key 40a attached to the rotor shaft 14 is engaged with a keyway 40b provided in pulley 37 to mount the pulley 37 at a rear lateral end in such a manner that the rotor shaft 14 and pulley 37 rotate as one piece. Further, the one-way clutch 16 is installed between the rotor shaft 14 and the hub 13b. This one-way clutch 16 has the same structure as the one-way clutches (16a and 16b) that are described in conjunction with the first embodiment. In the description of the fourth embodiment, therefore, the structure of the one-way clutch 16 will not be described again in detail. However, the components of the one-way clutch 16 are described with reference numerals assigned in order to indicate the correlation with a structure shown in FIGS. 3 to 5. Therefore, the drawings used to describe the fourth embodiment do not duplicately show the structure of the one-way clutch 16. However, it should be understood that the one-way clutch 16 structured as shown in FIGS. 3 to 5 exists in a location where the presence of the one-way clutch 16 is indicated. In the fourth embodiment of the wind turbine generator, the rotor shaft 14 is coupled to the center shaft 27 by the key 32 and keyway 27b in such a manner that the two shafts can rotate as one piece, and the outer shaft 26 is coupled to the hub 13b by the key 31 and keyway 27b in such a manner that the outer shaft 26 and the hub 13b can rotate as one piece.

The operation of the fourth embodiment of the wind turbine generator, which is configured as described above, will now be described. As a basic operation that is performed when the wind blows from the right-hand side of FIG. 10, the first blade assembly 1, which is directly coupled to the rotor shaft 14 via the hub 13a, and the second blade assembly 3, which is mounted via the one-way clutch 16 and the hub 13b, both catch the wind and rotate in the normal direction. While the blade assemblies rotate in the normal direction, the rotation of the first blade assembly 1 and second blade assembly 3 is transmitted to pulley 37 via the rotor shaft 14. This rotation is further transmitted from the pulley 37 to the driven pulley 38 via the endless belt 8 to drive the power generator 11. The rotation of the second blade assembly 3 is transmitted to pulley 37 via the hub 13b and one-way clutch 16. This rotation is further transmitted from the pulley 37 to the driven pulley 38 via the endless belt 8 to drive the power generator 11. In other words, the first blade assembly 1 and second blade assembly 3 rotate together with the rotor shaft 14 and pulley 37 as one piece and use a directly-coupled structure under normal conditions to respectively transmit motive power to the power generator 11.

If the wind velocity lowers later, the first blade assembly 1 and second blade assembly 3 both continue rotating for a while by the force of inertia. The first blade assembly 1 and second blade assembly 3 soon begin to decelerate due to significant torque braking by the blades 12a and 12b. As a result, the center shaft 27 within the one-way clutch 16 begins to rotate at a relatively high speed and unlocks the one-way clutch 16. The second blade assembly 3 is then disconnected from the rotor shaft 14, and the resistance (load) of the second blade assembly 3 is not transmitted to the power generator 11. Therefore, the power generator 11 whose load is now reduced can continue rotating for a considerably longer period of time. If, sooner or later, the wind velocity increases, the second blade assembly 3 suddenly rotates, causing the outer shaft 26 to rotate faster than the center shaft 27. This causes the one-way clutch 16 to lock so that the first blade assembly 1 and second blade assembly 3 start rotating again as one piece. As a result, the one-way clutch 16 disengages to accelerate the power generator 11, which is more or less decelerated, and impart high torque to it.

Consequently, the fourth embodiment of the wind turbine generator, which is configured as described above, causes the one-way clutch 16 to separate the second blade assembly 3 from the power generator 11 and lets the first blade assembly 1 and second blade assembly 3 interact with each other, thereby making it possible to extract the energy of the wind with high efficiency even when the wind is blowing soft.

[Fifth Embodiment]

Figure 11:
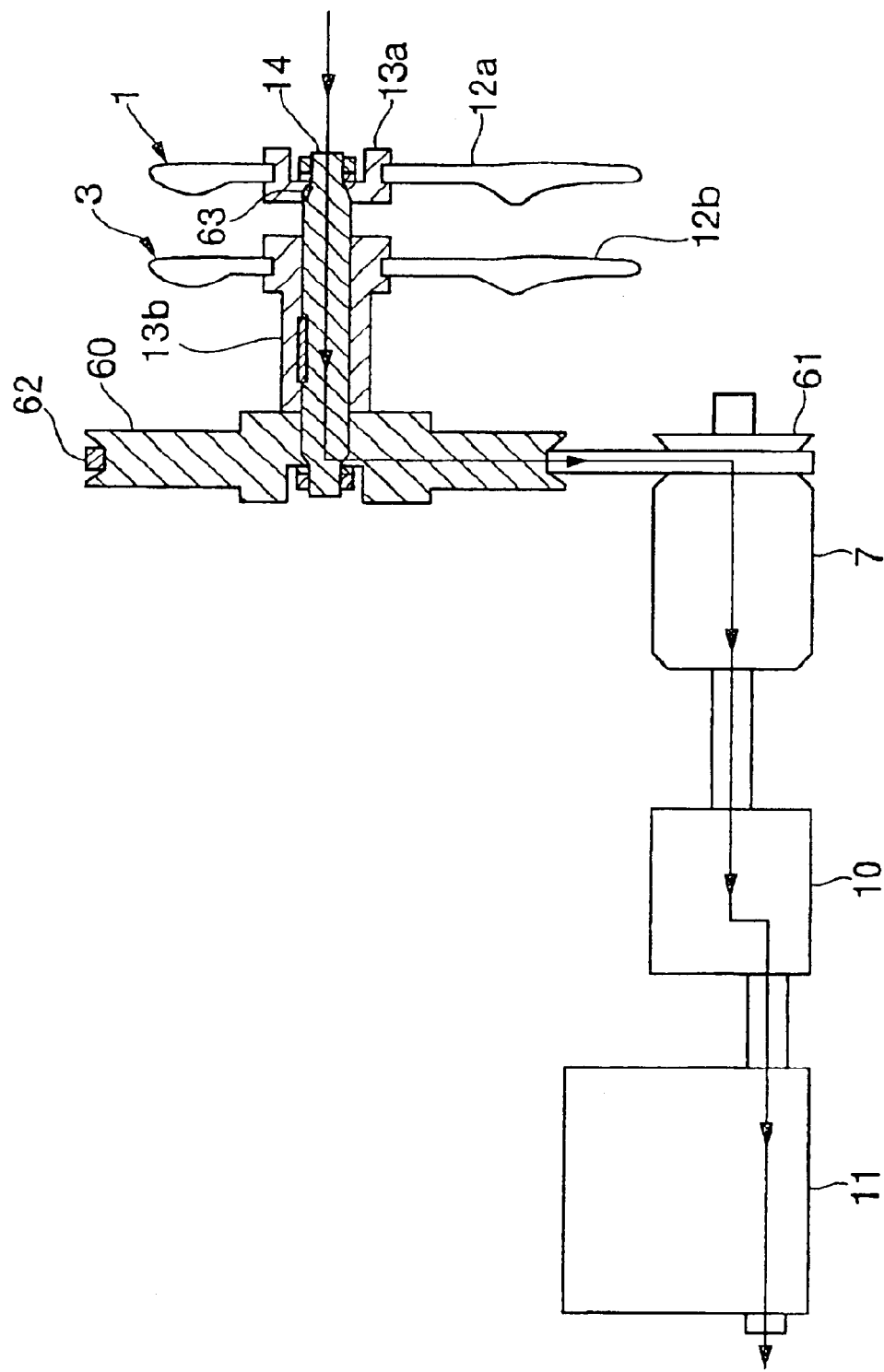
FIG. 11 is a vertical cross-sectional side view of a fifth embodiment of a wind turbine generator according to the present invention.

A fifth embodiment of a wind turbine generator according to the present invention will now be described with reference to FIGS. 11 and 12. FIG. 11 is a schematic diagram illustrating major components of a wind turbine generator according to the present invention. The portion depicted in this figure is a turbine section of the wind turbine generator, which corresponds to the nacelle b described with reference to FIG. 1. The fifth embodiment greatly differs from the first to fourth embodiments. One difference is that the fifth embodiment includes no one-way clutch although the first to fourth embodiments provide the one-way clutch 16 between the first blade assembly 1 and second blade assembly 3. Another difference is that the fifth embodiment prescribes the relative angle between the blades 12a of the first blade assembly 1 and the blades 12b of the second blade assembly 3 and installs the first blade assembly 1 and second blade assembly 3 with their angular relationship permanently set for the prescribed relative angle although the first to fourth embodiments do not prescribe the relative angle between the blades 12a of the first blade assembly 1 and the blades 12b of the second blade assembly 3. The other structural elements of the fifth embodiment are substantially the same as those of the first to fourth embodiments; therefore, like elements are designated by the same reference numerals as in the descriptions of the first to fourth embodiments.

The fifth embodiment of the wind turbine generator shown in FIG. 11 comprises a first blade assembly 1, a second blade assembly 3, and a pulley 60. The fifth embodiment also comprises a power transmission device 7, which includes a driven pulley 61 that is associated with the pulley 60. The pulley 60 is coupled to the driven pulley 61 via an endless belt 62 for motive power transmission purposes. Further, the output end of the power transmission device 7 is provided with a gearbox 10, which changes the rotating speed ratio, and a power generator 11, which receives converted motive power and is driven to rotate.

Figure 12:
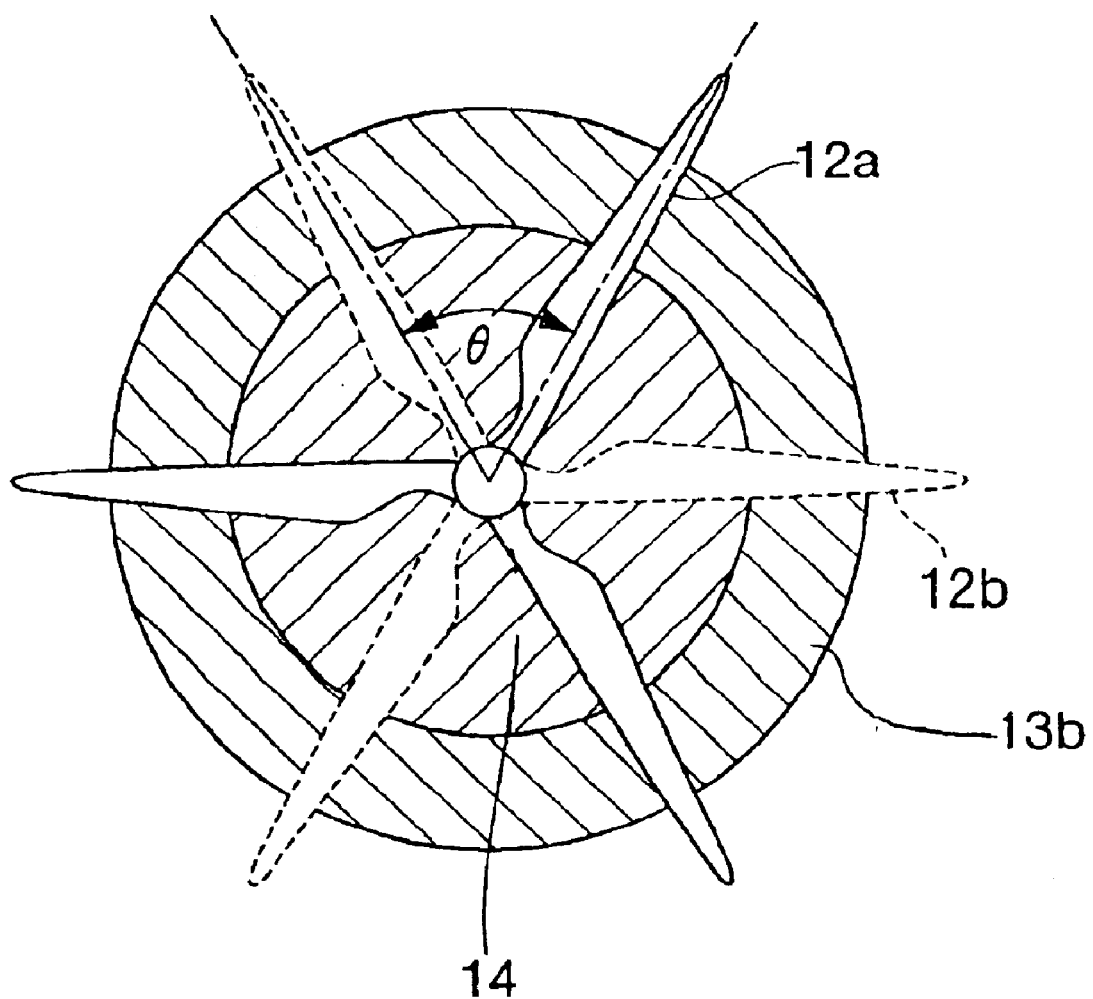
FIG. 12 illustrates the relative rotary positions of blades of blade assemblies of a wind turbine generator according to the fifth embodiment.

More specifically, the first blade assembly 1 and second blade assembly 3 each have three blades (12a or 12b), which are spaced at equal intervals of 120 degrees as is obvious from FIG. 12 when viewed from the front, and coupled to the rotor shaft section. FIG. 12 illustrates the prescribed relative angle between the blades 12a, 12b of the first blade assembly 1 and second blade assembly 3. The blades 12a, 12b drawn in FIG. 12 are reduced to a smaller scale than the other components for the purpose of clearly indicating the angular relationship between the blades 12a and 12b. In FIG. 12, the three blades drawn with a solid line are the blades 12a of the first blade assembly 1, whereas the other three blades, which are drawn with a broken line, are the blades 12b of the second blade assembly 3. The first blade assembly 1 and second blade assembly 3 are directly coupled to the rotor shaft 14 via the hub 13a and hub 13b, respectively. The pulley 60 is also directly coupled to the rotor shaft 14. Therefore, the first blade assembly 1, second blade assembly 3, and pulley 60 rotate together with the rotor shaft 14 as one piece. When the first blade assembly 1 and second blade assembly 3 are installed over the rotor shaft 14, the blades 12a of the first blade assembly 1 and the blades 12b of the second blade assembly 3 are positioned in such a manner as to produce an angular difference of θ in the direction of rotation (this angular difference is hereinafter referred to as "relative angle θ"). This blade assembly positioning is done to prevent the first blade assembly 1 and second blade assembly 3 from coinciding with each other when they rotate. FIG. 12 shows a case where relative angle θ is set to 45 degrees; however, relative angle θ is set in proportion to the distance between the blades 12a of the first blade assembly 1 and the blades 12b of the second blade assembly 3.

The operation of the fifth embodiment of the wind turbine generator, which is configured as described above, will now be described. When the wind blows from the right-hand side of FIG. 11, the first blade assembly 1 and second blade assembly 3 both catch the wind and rotate in the normal direction. The first blade assembly 1 and second blade assembly 3 constantly rotate together with the rotor shaft 14 and pulley 60 as one piece. The rotation of the pulley 60 is transmitted to the driven pulley 61 via the endless belt 62. This rotation is further transmitted via the power transmission device 7 and gear box 10 to drive the power generator 11.

In the fifth embodiment, the blades 12a of the first blade assembly 1 and the blades 12b of the second blade assembly 3 are positioned so as to produce an angular difference of θ in the direction of rotation, that is, to provide the relative angle θ; therefore, the resulting wind turbine generator minimizes the overall amount of wind noise. The principle of wind noise minimization will now be described. When the first blade assembly 1, which is positioned forward, and the second blade assembly 3, which is positioned rearward, catch the wind and rotate, the second blade assembly 3 receives not only the wind coming from the front but also the wind generated by the rotating first blade assembly 1. In this instance, the wind coming into contact with the blades 12a of the first blade assembly 1 generates wind noise; however, such wind noise is disturbed and deadened by the rotating blades 12b of the second blade assembly 3, which is positioned immediately behind the first blade assembly 1. Meanwhile, the wind coming into contact with the blades 12b of the second blade assembly 3 in the rear is constantly disturbed by the rotating blades 12a of the first blade assembly 1 in the front. Since the wind reaching the second blade assembly 3 is disturbed so as to reduce the strength of the wind, the amount of wind noise generated by the second blade assembly 3 in the rear is reduced. As a result, the total amount of wind noise is minimized. The effect of wind noise reduction is related to the front-rear distance between the first blade assembly 1 and second blade assembly 3 as well as the relative angle θ. However, the relative angle θ for the blades 12a, 12b of the first blade assembly 1 and second blade assembly 3 can be optimized when it is determined in accordance with the results of experiments conducted on the front-rear distance of the first blade assembly 1 and second blade assembly 3.

[Sixth Embodiment]

Figure 13:
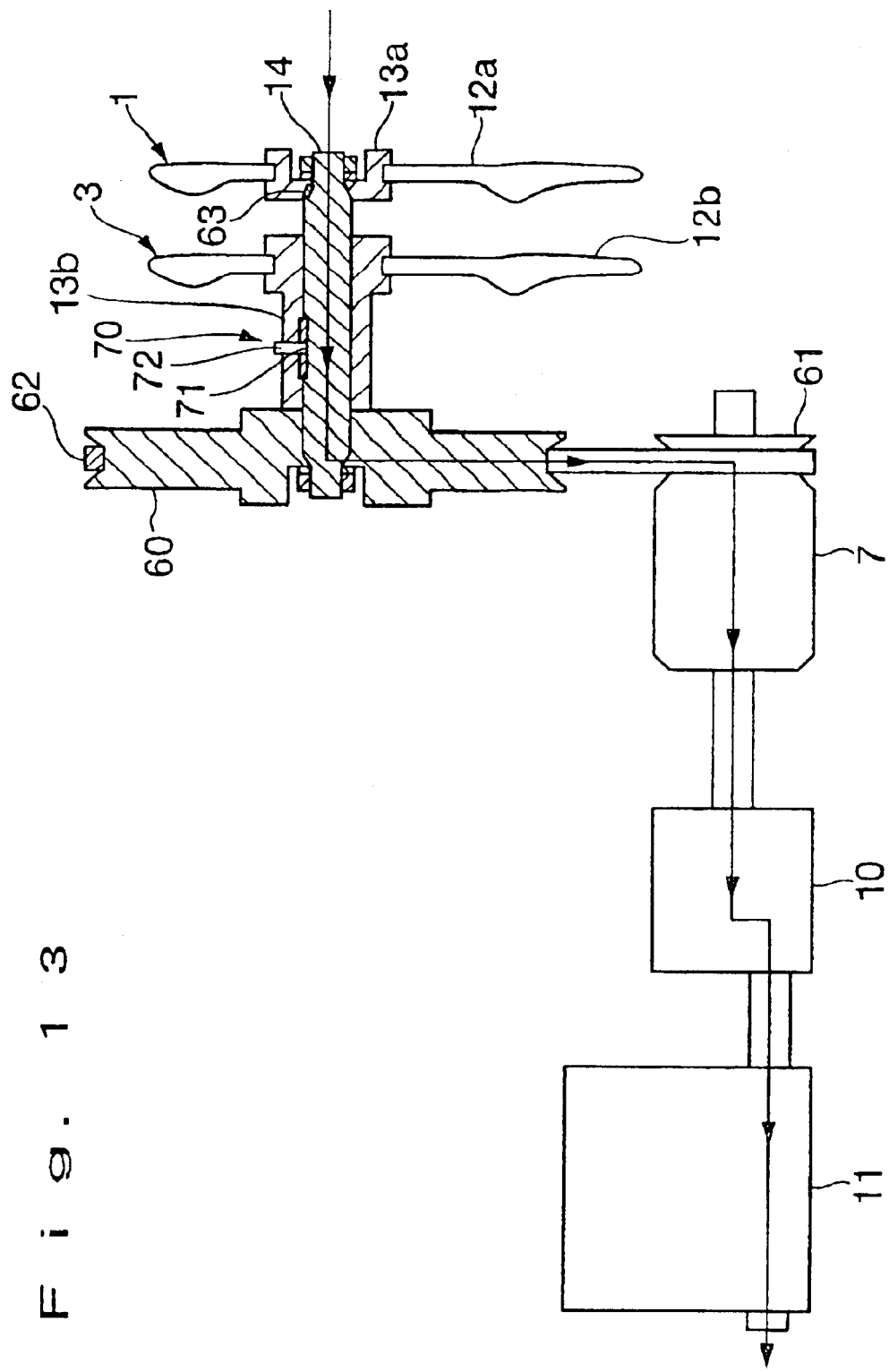
FIG. 13 is a vertical cross-sectional side view of a sixth embodiment of a wind turbine generator according to the present invention.
Figure 14:
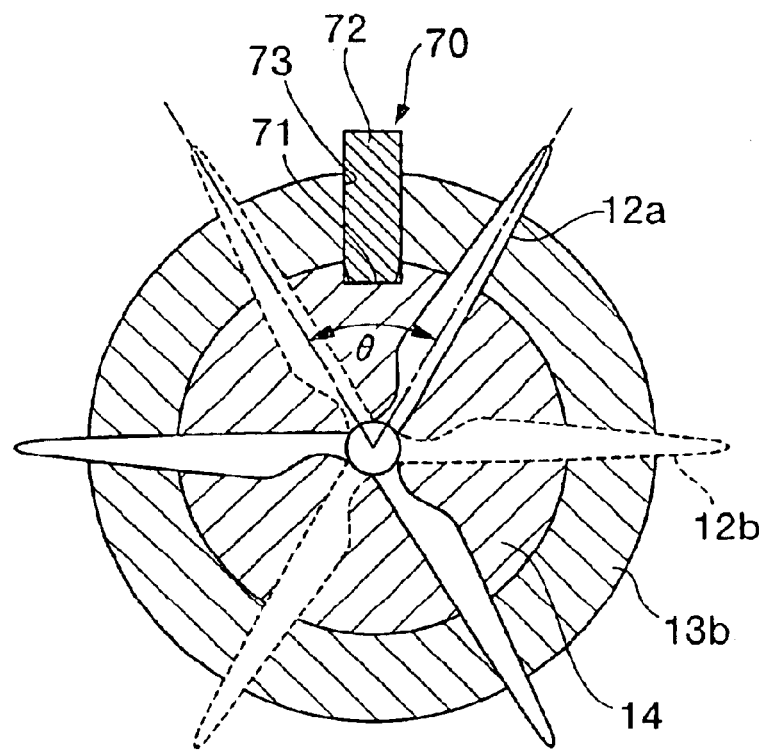
FIG. 14 illustrates a rotary angle adjustment mechanism in relation to the relative rotary positions of blades of blade assemblies of a wind turbine generator according to the sixth embodiment.
Figure 15:
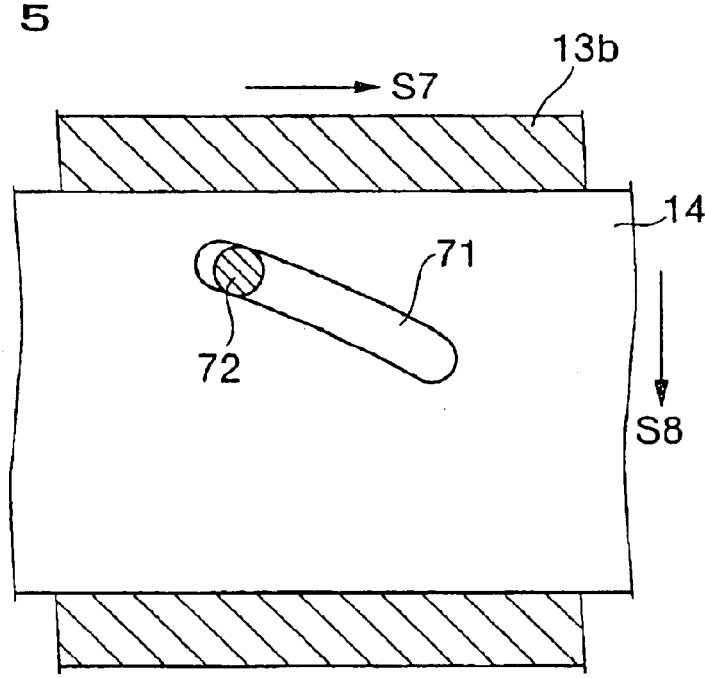
FIG. 15 illustrates the operation of a rotary angle adjustment mechanism of a wind turbine generator according to the sixth embodiment.

FIGS. 13 to 15 illustrate a sixth embodiment of a wind turbine generator according to the present invention. FIG. 13 is a schematic diagram illustrating major components of the wind turbine generator according to the present invention. The portion depicted in this figure is a turbine section of the wind turbine generator, which corresponds to the nacelle b described with reference to FIG. 1. The sixth embodiment is obtained by modifying part of the structure of the fifth embodiment. The structure of the sixth embodiment greatly differs from that of the fifth embodiment in that the sixth embodiment adopts a rotary angle adjustment mechanism 70. The rotary angle adjustment mechanism 70 makes it easy to set an optimum value for relative angle θ, which represents an angular difference between the blades 12a of the first blade assembly 1 and the blades 12b of the second blade assembly 3. The other structural elements of the sixth embodiment are substantially the same as those of the fifth embodiment; therefore, like elements are designated by the same reference numerals as in the description of the fifth embodiment.

The rotary angle adjustment mechanism 70 comprises a cam groove 71, which is provided in the outer circumferential surface of the rotor shaft 14, and a pin member 72, which engages with the cam groove 71. More specifically, the cam groove 71 is elongated in the longitudinal direction (front-rear direction) of the rotor shaft 14. This cam groove 71 is shaped so that the cam groove inclines in the direction of rotation as it extends in the longitudinal direction. The position, inclination, and shape of the cam groove 71 are set with reference to a reference part of the rotor shaft 14 for optimum results while taking experiment results and other relevant data into consideration. In the sixth embodiment, the part used as the references is a key coupling section 63, which is formed by a key and the keyway provided between the rotor shaft 14 and the hub 13a on which the first blade assembly 1 is mounted. The pin member 72 is positioned in relation to the cam groove 71, that is, lodged in a mounting through-hole 73, which is provided in the hub 13b of the second blade assembly 3. The end of the pin member 72 is in engagement with the cam groove 71.

For assembling the rotary angle adjustment mechanism 70, which is configured as described above, the blades 12a of the first blade assembly 1 are fastened to the hub 13a. With the blades 12b of the second blade assembly 3 are fastened to the hub 13b, the hub 13b is installed over the rotor shaft 14. Further, while the mounting through-hole 73 is properly positioned relative to the cam groove 71, the pin member 72 is inserted into the mounting through-hole 73 to temporarily engage the end of the pin member 72 with the cam groove 71. The rotation of blades 13b is then restricted in relation to the rotor shaft 14. Next, blades 13a are installed over the end of the rotor shaft 14 in such a manner as to prevent the blades 13a from rotating relative to the rotor shaft 14, and then fixed in position. This also determines the position of the blades 12a of the first blade assembly 1 in relation to the rotor shaft 14.

Next, the position of blades 13b is adjusted and conclusively fixed in relation to the rotor shaft 14. This conclusive fixing operation will now be described with reference to FIG. 15. While the pin member 72 is engaged with the cam groove 71, the hub 13b is moved in the direction of arrow S7. Due to the cam action provided by the pin member 72 and cam groove 71, the hub 13b then receives the force of rotation in the direction of arrow S8 and rotates relative to the rotor shaft 14. This rotation changes the relative angle θ between the blades 12b of the second blade assembly 3 and the blades 12a of the first blade assembly 1. Therefore, when the front-rear position of the blades 12b of the second blade assembly 3 is adjusted in relation to the blades 12a of the first blade assembly 1 over the rotor shaft 13, the relative angle θ between the blades 12a and the blades 12b automatically changes so that an optimum relative angle θ value is obtained in accordance with the mounting position. This makes it easy to install the first blade assembly 1 and second blade assembly 3 over the rotor shaft 14 and adjust the relative angle θ.

The operation of the sixth embodiment of the wind turbine generator, which is configured as described above, will now be described. When the wind blows from the right-hand side of FIG. 13, the first blade assembly 1 and second blade assembly 3 both catch the wind and rotate in the normal direction. The first blade assembly 1 and second blade assembly 3 constantly rotate together with the rotor shaft 14 and pulley 60 as one piece. The rotation of the pulley 60 is transmitted to the driven pulley 61 via the endless belt 62. This rotation is further transmitted via the power transmission device 7 and gearbox 10 to drive the power generator 11. In the sixth embodiment, too, an angular difference of θ is produced between the blades 12a of the first blade assembly 1 and the blades 12b of the second blade assembly 3. Therefore, the resulting wind turbine generator minimizes the overall amount of wind noise on the principle of wind noise minimization, which was described in conjunction with the fifth embodiment.

For the rotary angle adjustment mechanism 70 according to the sixth embodiment disclosed above, the cam groove 71 is provided in the outer circumferential surface of the rotor shaft 14 with the pin member 72 mounted on the hub 13b for the second blade assembly 3. However, the same effect can also be produced even when the pin member 72 is fastened to the rotor shaft 14 and an elongated cam groove (71) is provided in the hub 13b to engage the pin member 72 with the elongated hole (71).

[Seventh Embodiment]

Figure 16:
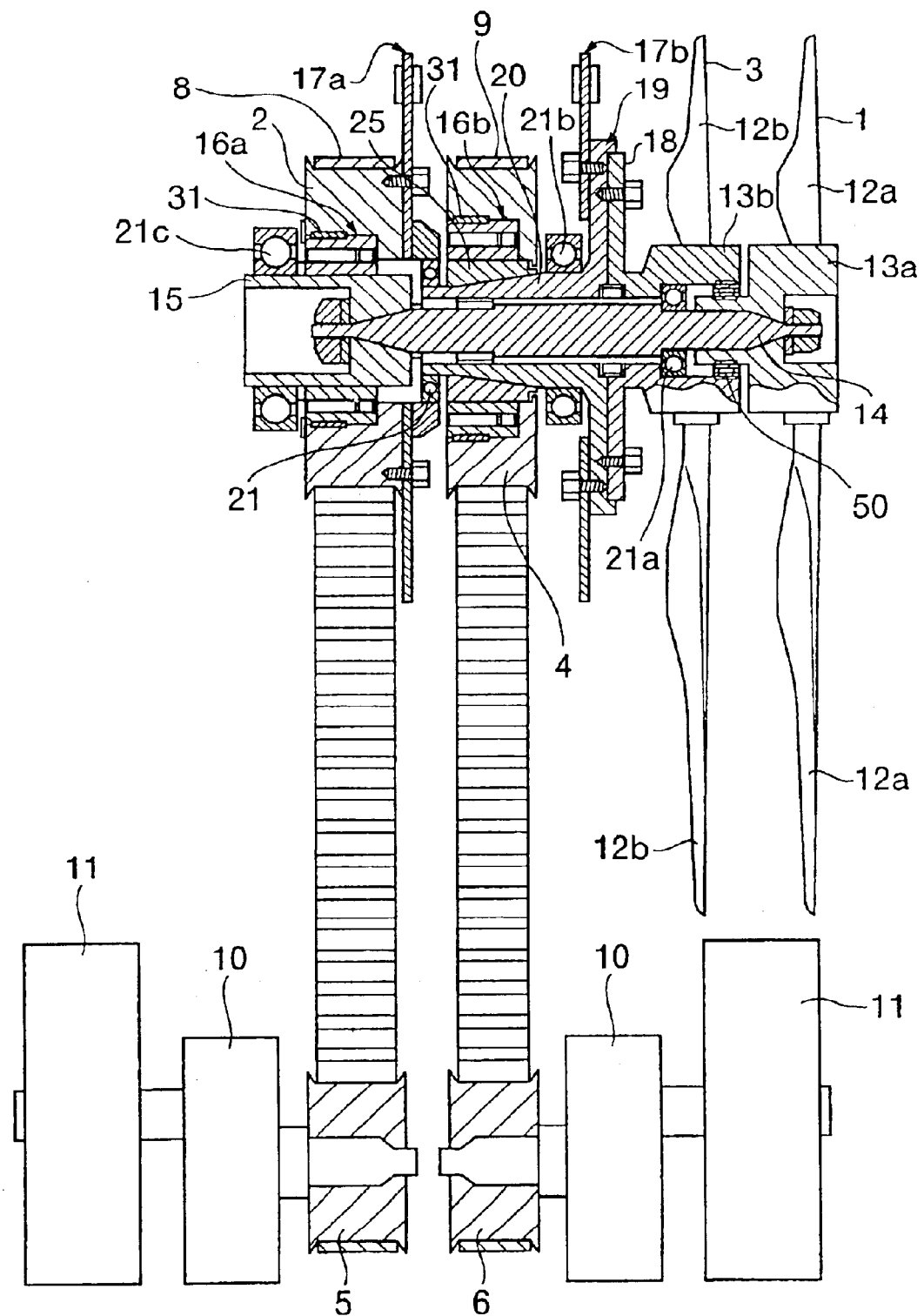
FIG. 16 is a vertical cross-sectional side view of a seventh embodiment of a wind turbine generator according to the present invention.
Figure 17:
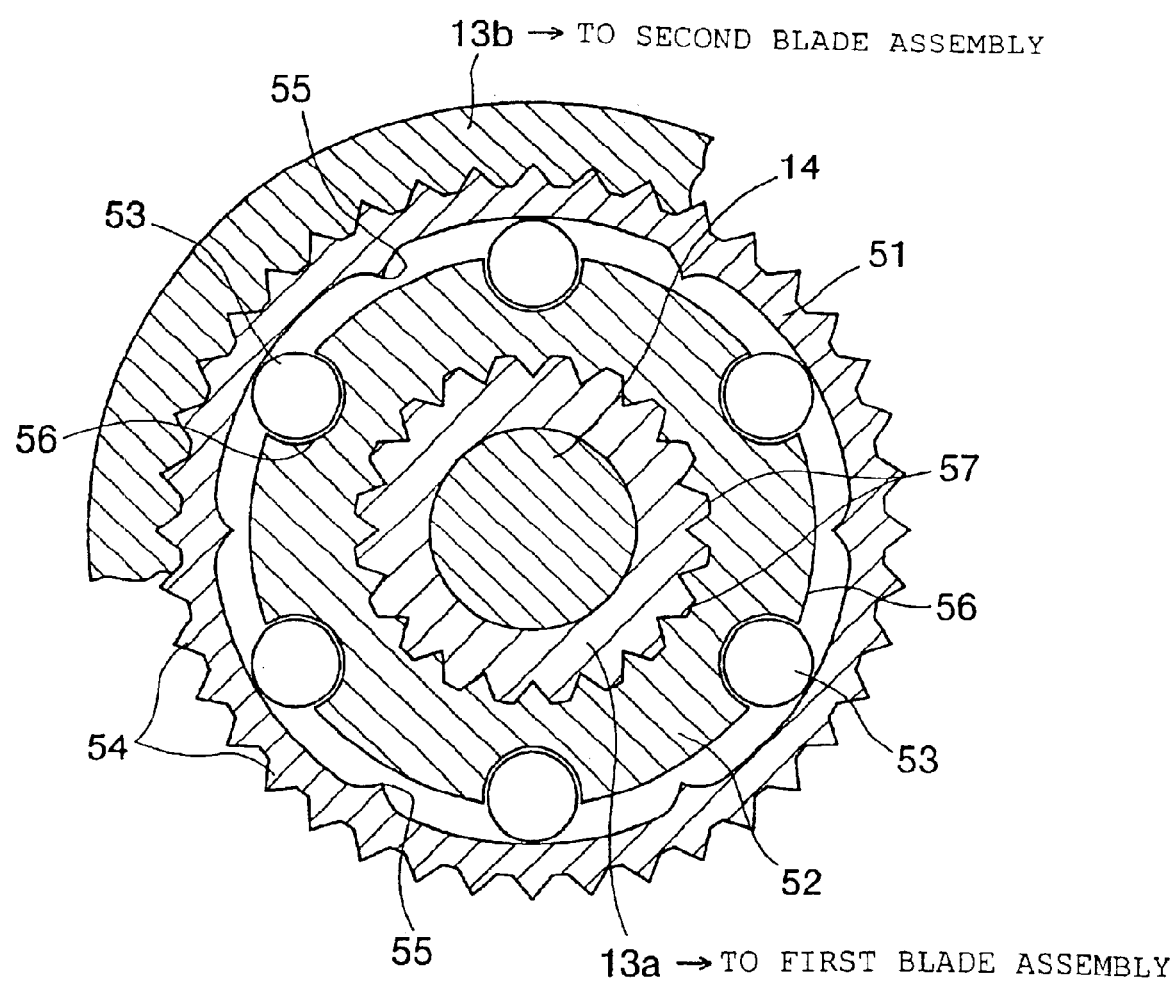
FIG. 17 is a cross-sectional view of a lock bearing according to the seventh embodiment, which is obtained by a perpendicular cut through the central axis of the lock bearing.
Figure 18:
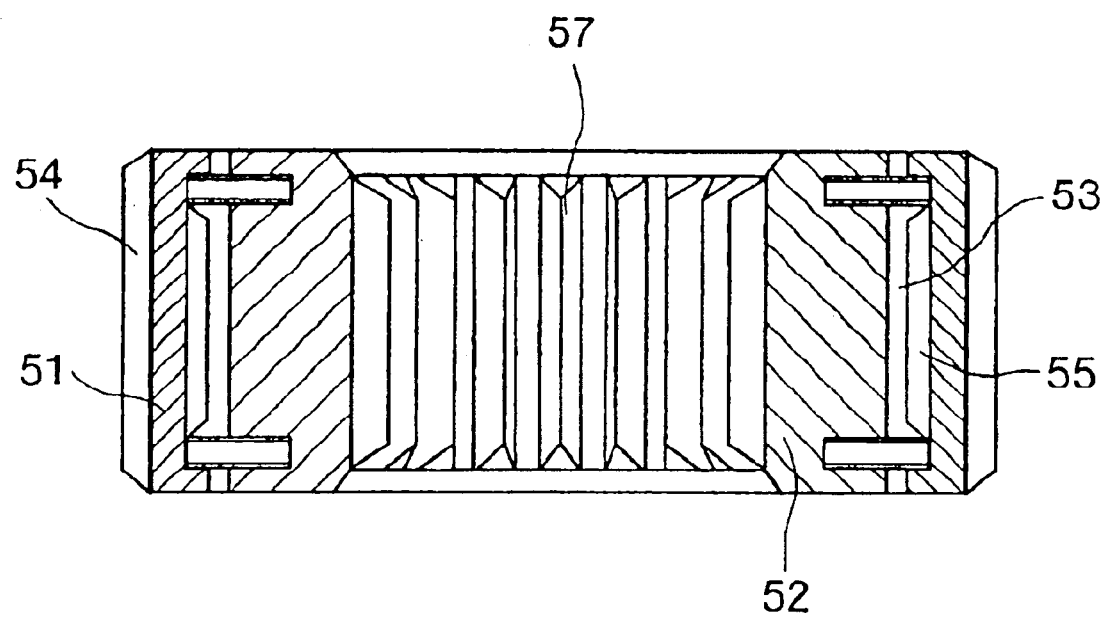
FIG. 18 is a cross-sectional view of a lock bearing according to the seventh embodiment, which is obtained by a cut along the central axis of the lock bearing.
Figure 19:
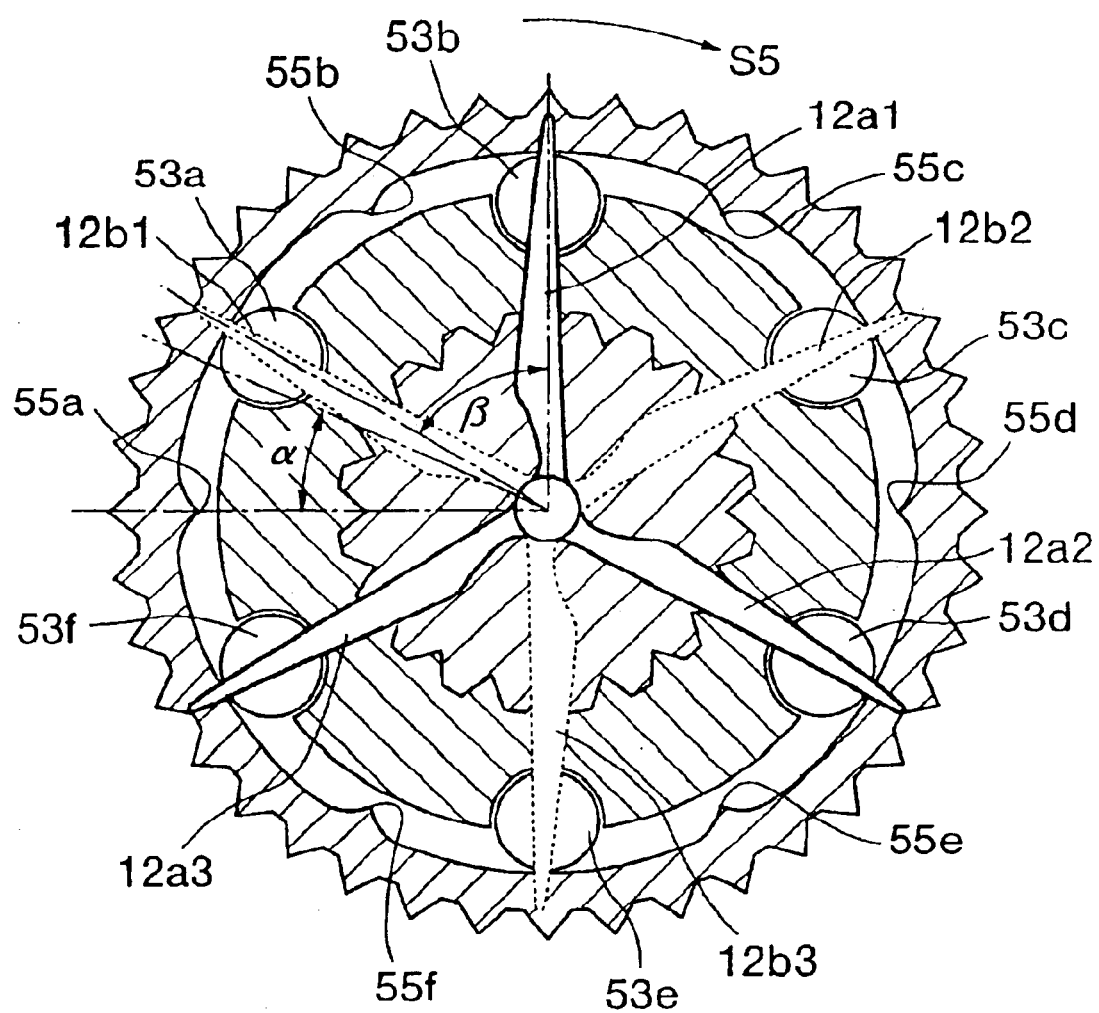
FIG. 19 illustrates the operation of a lock bearing according to the seventh embodiment in relation to the rotary positions of blades of blade assemblies.

FIGS. 16 to 20 illustrate the seventh embodiment of a wind turbine generator according to the present invention. FIG. 16 is a vertical cross-sectional side view of the seventh embodiment of a wind turbine generator. FIG. 17 is a cross-sectional view of a lock bearing according to the seventh embodiment, which is obtained by a perpendicular cut through the central axis of the lock bearing. FIG. 18 is a cross-sectional view of a lock bearing according to the seventh embodiment, which is obtained by a cut along the central axis of the lock bearing. FIG. 19 illustrates the operation of a lock bearing according to the seventh embodiment in relation to the rotary positions of blades of blade assemblies.

The configuration of the seventh embodiment of a wind turbine generator is basically the same as that of the first embodiment of a wind turbine generator, which is shown in FIGS. 2 to 4. However, the configuration of the seventh embodiment differs from that of the first embodiment, as is obvious from FIG. 16, in that a lock bearing is provided between the hub 13a, which mounts and supports the first blade assembly 1 and the hub 13b, which mounts and supports the second blade assembly 3, and that the first blade assembly 1 and second blade assembly 3 rotate while maintaining a predefined angular relationship, which is represented by the relative angle θ defined for the fifth and sixth embodiments. When it comes to the structure, the seventh embodiment is, so to speak, a mixture of the first embodiment shown in FIGS. 2 to 4, the fifth embodiment shown in FIGS. 11 and 12, and the sixth embodiment shown in FIGS. 13 to 15.

FIGS. 17 and 18 illustrate the structure of a lock bearing 50. FIG. 17 is a cross-sectional view of the lock bearing 50, which is obtained by a perpendicular cut through the central axis of the lock bearing 50. FIG. 19 is a cross-sectional view of the lock bearing 50, which is obtained by a cut along the central axis of the lock bearing 50. In these figures, the lock bearing 50 comprises an outer shaft 51 having a cylindrical structure, a center shaft 52 which is positioned within a cylindrical body of the outer shaft 51 with a gap provided between the surface of the center shaft 52 and the inner surface of the outer shaft 51, and rollers 53 which are positioned between the outer shaft 51 and center shaft 52. A plurality of outer circumferential engagement teeth 54 are formulated on the outer circumferential surface of the outer shaft 51 in such a manner as to continuously extend in the direction of the central axis (in the same direction). The outer circumferential engagement teeth 54 are provided on the outer circumferential surface of the outer shaft and spaced at equal intervals. As a result, the outer shaft 51 has a spline shaft structure. Further, a plurality of lock teeth 55 are formed on the inner circumferential surface of the outer shaft 51, extended along the central axis of the outer shaft 51, and projected radially from the inner circular surface of the outer shaft 51 and toward the inside.

The basic cross-sectional structure of the center shaft 52 is circular. The outer circumferential surface of the center shaft 52 is provided with a plurality of concave bearing supports 56, which are circumferentially spaced at equal intervals. The inner circumferential surface of the center shaft 52 is provided with a plurality of inner circumferential keyways 57, which are continuously extended along the central axis of the center shaft 52. The inner circumferential keyways 57 are positioned along the inner circumferential surface of the center shaft 52 and spaced at equal intervals. Within a space between the outer shaft 51 and center shaft 52, the rollers 53 are positioned within the bearing supports 56 of the center shaft 52. In the seventh embodiment, six lock teeth 55 are provided on the inner circumferential surface of the outer shaft 51 and spaced at equal intervals. Further, six bearing supports 56 and six rollers 53 are also positioned along the inner circumferential surface of the outer shaft 51 and the outer circumferential surface of the center shaft 52 and spaced at equal intervals. The gap between the outer shaft 51 and center shaft 52 may be left as is or filled with a lubricant or other sealant.

Since the lock bearing 50 is configured as described above, the outer shaft 51 and center shaft 52 perform either an independent operation or an interlocked operation. In the independent operation, the outer shaft 51 and center shaft 52 rotate independently without interfering with each other. In the interlocked operation, these two shafts are interlocked with each other so that one gives motive power to the other to drive it.

FIG. 16 will now be referenced to describe how the lock bearing 50 is mounted in the wind turbine generator. The outer shaft 51 of the lock bearing 50 is mounted inside the cylinder of the hub 13b, which mounts and supports the second blade assembly 3. Within the cylinder of the hub 13b, therefore, a plurality of rows of keyways are provided in relation to the outer circumferential engagement teeth 54 on the outer shaft 51. These keyways engage with the outer circumferential engagement teeth to achieve one-piece coupling. Meanwhile, the center shaft 52 of the lock bearing 50 is mounted on the outside of the cylinder of the hub 13a, which mounts and supports the first blade assembly 1. Therefore, a spline shaft structure results as a plurality of rows of engagement teeth mating with the inner circumferential keyways 57 in the center shaft 52 are provided on the outside of the cylinder of the hub 13a. The inner circumferential keyways 57 engage with the engagement teeth to achieve one-piece coupling. Due to the mounting structure described above, the first blade assembly 1 and second blade assembly 3 independently rotate in the same direction via the lock bearing 51 without interfering with each other (independent operation) or rotate in the same direction while either one gives motive power to the other to drive it (interlocked operation).

The seventh embodiment also prescribes the angular positions at which the blades 12a, 12b of the first blade assembly 1 and second blade assembly 3 are mounted in relation to the abovementioned lock bearing 50. FIG. 19 illustrates the angular positions for mounting the blades 12a, 12b of the first blade assembly 1 and second blade assembly 3 and the relative position information relationship between the blades 12a of the first blade assembly 1 and the blades 12b of the second blade assembly 3. The blades 12a and 12b drawn in FIG. 19 are reduced to a relatively small scale, and the lock bearing 50 drawn in the same figure are relatively enlarged. They are drawn in this manner in order to clearly indicate the relationship between the angular positions of the components of the lock bearing 50 and the angular positions of the blades 12a, 12b, which is prevalent during blade assembly rotation.

In FIG. 19, it is assumed that the three blades indicated by solid lines are the blades 12a of the first blade assembly 1 whereas the three blades indicated by dotted lines are the blades 12b of the second blade assembly 3. As is obvious from the configuration of the wind turbine generator shown in FIG. 16, the blades 12a are directly coupled to the center shaft 52 and the blades 12b are directly coupled to the outer shaft 51.

The operation of the lock bearing 50 in the configuration described above will now be described. When it is assumed that the outer shaft 51 is on the driving side whereas the center shaft 52 is on the driven side and as far as the first blade assembly 1 and second blade assembly 3 rotate at a normal low speed and independently of each other (at substantially the same rotating speed), the first blade assembly 1 and second blade assembly 3 independently rotate in the same direction without interfering with each other although the lock bearing 51 is positioned between them. It is assumed that the direction of rotation is as indicated by arrow S5 in FIG. 18. In this instance, the lock bearing 50 does not particularly lock so that both the outer shaft 51 and center shaft 52 perform independent operations at substantially the same predetermined speed. This state is indicated in FIGS. 18 and 19.

In a wind turbine generator in which the first blade assembly 1 and second blade assembly 3 are arranged tandem, the second blade assembly 3 generally catches the wind under better conditions as described earlier. Therefore, the first blade assembly 1 and second blade assembly 3 start rotating at substantially the same rotating speed; however, the second blade assembly 3 soon begins to rotate at a speed slightly higher than that of the first blade assembly 1. For the lock bearing 50, this means that the outer shaft 51 rotates faster than the center shaft 52. When the lock teeth 55 (which are individually assigned reference numerals 55a, 55b, 55c, and so on to 55f) and rollers 53 (which are individually assigned reference numerals 53a, 53b, 53c, and so on to 53f) in FIG. 14 are noted, the figure indicates that when the outer shaft 51 rotates at a relatively high speed in the direction of arrow S5 in FIG. 19, lock tooth 55a follows roller 53a, approaches it, and eventually overtakes it to lock it. When the roller is locked, the outer shaft 51 and center shaft 52 rotate in the direction of arrow S5 as one piece. Meanwhile, when the blades 12a (which are individually assigned reference numerals 12a1, 12a2, and 12a3) and blades 12b (which are individually assigned reference numerals 12b1, 12b2, and 12b3) are noted, the blade 12b1, for example, follows the blade 12a1 and approaches it. It is assumed that blades 12a1, 12a2, and 12a3 are spaced at equal intervals of 120 degrees, and that the blades 12b1, 12b2, and 12b3 are also spaced at equal intervals of 120 degrees.

The relationship between the angular positions of the blades 12a1 and 12b1 that is prevalent while the above lock is applied will now be described. If, in FIG. 19, the angular position difference between the lock tooth 55a and the roller 53a is α during the interval between the instant at which the lock tooth 55a follows the roller 53a and the instant at which the lock tooth 55a applies the lock, and the angular position difference between the blades 12a1 and 12b1 is β under the same conditions, the following equation is obtained:

$$\alpha < \beta \qquad \text{Equation 1}$$

The above equation means that even when the lock tooth 53a follows the roller 53a and then overtakes it to lock it, causing the outer shaft 51 to rotate together with the center shaft 52 as one piece, the blade 12b1 still does not reach the blade 12a1 or coincide with it. It goes without saying that this holds true for the other blades (e.g., blades 12b2 and 12a2). In the seventh embodiment, the angular position for mounting the blades 12b on the outer shaft 51 (or for mounting the second blade assembly 3) and the angular position for mounting the blades 12a on the center shaft 52 (or for mounting the first blade assembly 1) are set so that the blades 12a and 12b do not overtake or outrun one another. The angular positions for mounting the blades 12a and 12b can be set by selecting an appropriate relationship between the outer circumferential engagement teeth 54 and mating keyways, which is prevalent when the above outer shaft 51 couples with the hub 13b, and an appropriate relationship between the inner circumferential keyways 57 and mating engagement teeth, which is prevalent when the above center shaft 52 couples with the hub 13a.

The same measures can also be taken when the outer shaft 51 of the lock bearing 50 moves relatively backward. If, in FIG. 19, the angular position difference between the lock tooth 55a and the roller 53f is γ during the interval between the instant at which lock tooth 55a follows roller 53f and the instant at which the lock tooth 55a applies the lock, and the angular position difference between the blades 12a3 and 12b1 is δ under the same conditions, the following equation is obtained:

$$\gamma < \delta \qquad \text{Equation 2}$$

Experiments conducted have revealed that the following relational expression should be met in Equation 1 above to obtain favorable results.

$$\alpha + 20° \leq \beta \qquad \text{Equation 3}$$

More specifically, favorable results are obtained when a value of approximately 20 degrees is set as the minimum angular position difference between the blades 12a1 and 12b1 that is prevalent when the blade 12b1 is positioned closest to the blade 12a1. The experiments have also revealed that favorable results are obtained when a value between 30° and 45° is set as the maximum angular position difference between the blades 12a1 and 12b1 that is prevalent when the blade 12b1 is positioned farthest from the blade 12a1.

When the first blade assembly 1 and second blade assembly 3 rotate in such a relationship that the blades 12a do not coincide with the blades 12b, the first blade assembly 1 and second blade assembly 3 do not coincide with each other to collide against each other or interfere with each other even when the blades 12a, 12b of the first blade assembly 1 and second blade assembly 3 are significantly bent or otherwise deformed by the force of the wind that blows hard from the front of the first blade assembly 1 and second blade assembly 3. In addition, the wind turbine generator can generate electrical power with high efficiency as described in conjunction with the first to fourth embodiments.

It is generally desirable that setup be performed so as to satisfy Equation 1 prior to Equation 2. In reality, however, setup may be performed to satisfy either or both of Equation 1 and Equation 2 in accordance with the condition of the wind (direction, velocity, degree of turbulence, frequency of gust) in an area where the wind turbine generator is installed.

Figure 20:
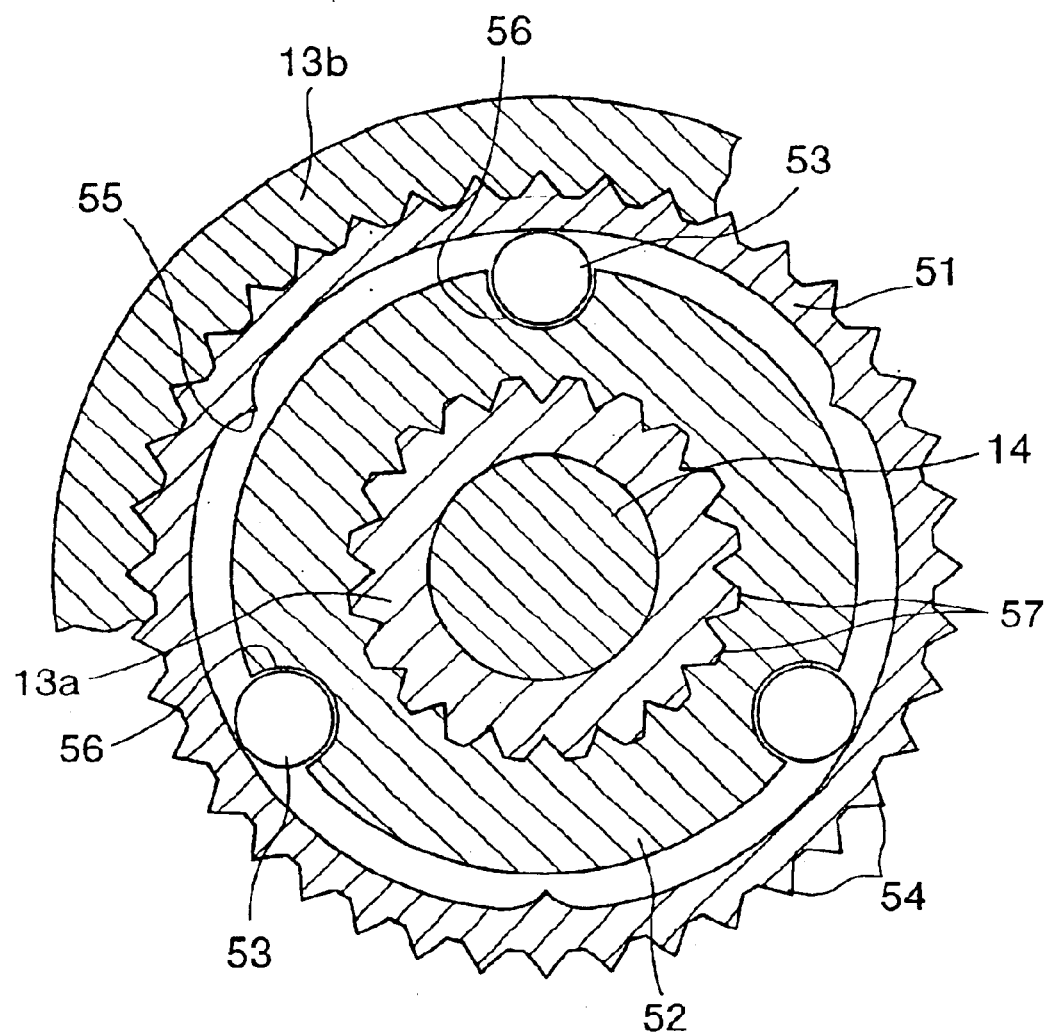
FIG. 20 is a cross-sectional view of an example of a modified lock bearing according to the seventh embodiment, which is obtained by a perpendicular cut through the central axis of the lock bearing.

FIG. 20 shows an example of a modified version of the seventh embodiment. In this example, the three lock teeth 55 of the outer shaft 51 are provided on the inner circumferential surface of the outer shaft 51 and spaced at equal intervals. Further, three bearing supports 56 and the three rollers 53 are provided for the center shaft 52 and spaced at equal intervals. When this configuration is employed, an increased range of play can be provided for the lock bearing 50 so as to provide an increased degree of free rotation for the first blade assembly 1 and second blade assembly 3.

The lock bearing 50 for use with the seventh embodiment can also be applied to the second to fourth embodiments of the wind turbine generator so that both the high performance and safety assurance features can be incorporated in each embodiment. When, for instance, the lock bearing 50 for the seventh embodiment is applied to the second to fourth embodiments, which are shown in FIG. 8, 9, or 10, the purpose is accomplished by furnishing the lock bearing 50, in replacement of the one-way clutch 16, among the power generator, the rotor shaft 14 which is the first rotation axis means, and the hub 13b which is the second rotation axis means that is installed substantially concentrically with the rotor shaft 14. Instead of furnishing the lock bearing 50 in replacement of the one-way clutch 16 as described above, the lock bearing 50 may alternatively be installed between the rotor shaft 14 and the hub 13b with the one-way clutch 16 left installed as it is. When this configuration is formed, the one-way clutch 16 basically becomes engaged and disengaged as described above for the purpose of causing the first blade assembly 1 and second blade assembly 3 to rotate while affecting each other, and applying the lock with the lock bearing when the blades 12b of the second blade assembly 3 are about to coincide with or outrun the blades 12a of the first blade assembly 1.

[Eighth Embodiment]

Figure 21:
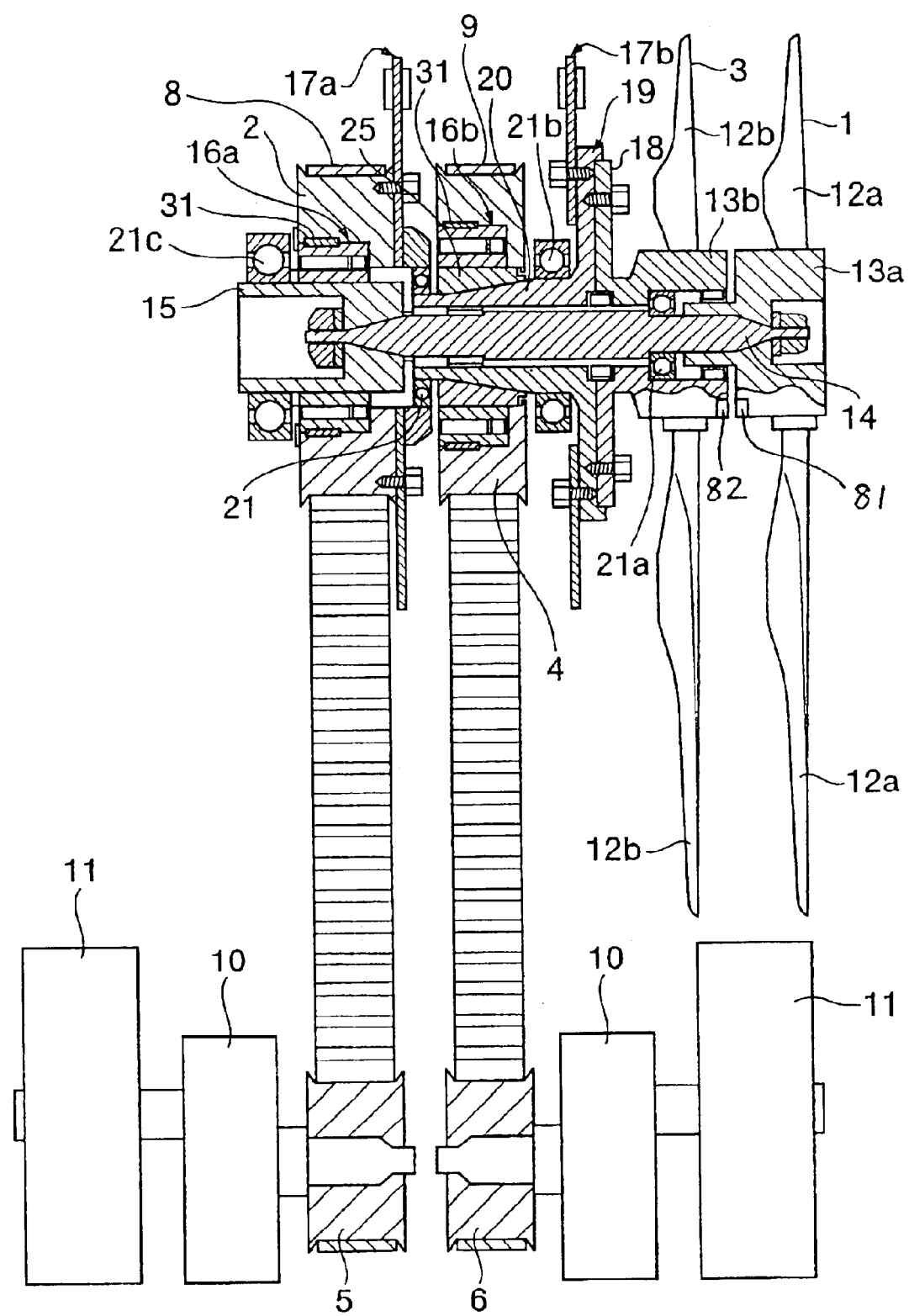
FIG. 21 is a vertical cross-sectional side view of an eighth embodiment of a wind turbine generator according to the present invention.
Figure 22:
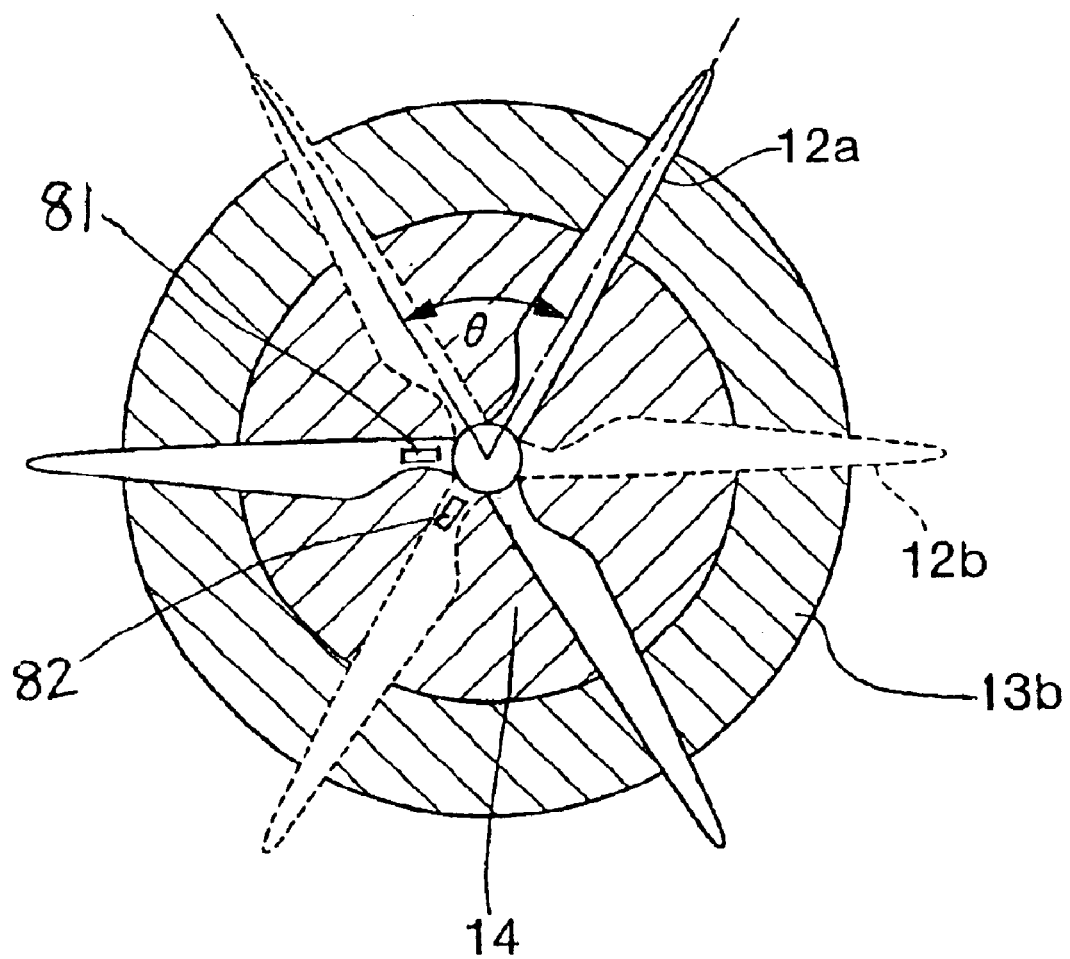
FIG. 22 illustrates a configuration in which a magnet is attached to a blade of each blade assembly of a wind turbine generator according to the eighth embodiment and indicates the angular position differences among the blades of blade assemblies.

FIGS. 21 and 22 illustrate the eighth embodiment of a wind turbine generator according to the present invention. FIG. 21 is a vertical cross-sectional side view of the eighth embodiment of a wind turbine generator. The configuration for the eighth embodiment is substantially the same as indicated by the vertical cross-sectional side view of the first embodiment described earlier. FIG. 22 illustrates a configuration in which a magnet is attached to a blade of each blade assembly of the wind turbine generator according to the eighth embodiment and indicates the angular position differences among the blades of blade assemblies.

The eighth embodiment differs from the first one in that the eighth embodiment of the wind turbine generator according to the present invention is provided with magnets 81, 82, which are attached to the bases of the blades 12a of the first blade assembly and the blades 12b of the second blade assembly as indicated in FIGS. 21 and 22. The magnet 81 is attached to the base of a blade 12a of the first blade assembly, whereas the magnet 82 is attached to the base of a blade 12b of the second blade assembly. Further, the magnets 81 and 82 are positioned so that they can face each other. In the eighth embodiment, permanent magnets are employed as magnets 81 and 82. However, electromagnets may alternatively be used as the magnets 81 and 82.

The mounting positions of the magnets 81 and 82 are as indicated in FIG. 22. The magnets may be directly attached to the base of a blade 12a of the first blade assembly or a blade 12b of the second blade assembly. Alternatively, as shown in FIG. 21, the magnets may be attached to the rear lateral surface of the hub 13a on which the blades 12a of the first blade assembly are mounted, and to the front lateral surface of the hub 13b on which the blades 12b of the second blade assembly are mounted, positioned so as to be able to face each other, and spaced at predetermined intervals. However, even when the magnets 81 and 82 are attached to the rear lateral surface of the hub 13a and the front lateral surface of the hub 13b, their angular positions need to be adjusted in the direction of rotation of the first blade assembly 1 and second blade assembly 3 so that the magnets 81 and 82 face each other when the blades 12a of the first blade assembly coincide with (face) the blades 12b of the second blade assembly. In the present embodiment, the magnets 81 and 82 are of the same polarity. More specifically, when an N-pole magnet is used as the magnet 81, an N-pole magnet is also used as the magnet 82, and vice versa. The magnets 81 and 82 may be attached to single blades 12a, 12b, respectively, or attached to all the associated blades (three magnets for each blade assembly). The other structural elements of the present embodiment are the same as those of the first embodiment; therefore, like elements are designated by the same reference numerals and will not be described again.

The operation of the eighth embodiment of the wind turbine generator, which is configured as described above, will now be described. As described earlier in conjunction with the first embodiment, the interaction between the first blade assembly 1 and second blade assembly 3 during a period during which the first blade assembly 1 and second blade assembly 3 rotate is such that when the first blade assembly 1 and second blade assembly 3 are rotated by the normal wind, the second blade assembly 3 operates to rotate faster than the first blade assembly 1, causing the blades 12b of the second blade assembly to outrun the blades 12a of the first blade assembly. The blades 12a and 12b attempt to coincide with each other the moment the blades 12b of the second blade assembly overtakes and outruns the blades 12a of the first blade assembly. Further, the magnets 81 and 82 also attempt to coincide with each other at this moment. However, the magnets 81 and 82 are of the same polarity. Therefore, the magnets 81 and 82 repel each other so that the blades 12b of the second blade assembly cannot possibly coincide with the blades 12a of the first blade assembly. This ensures that the first blade assembly 1 and second blade assembly 3 will never coincide with each other in the direction of rotation.

Experiments conducted concerning the present invention have revealed that one rotating blade assembly occasionally accelerates or outruns the other rotating blade assembly. If the blades 12a of the first blade assembly coincide with the blades 12b of the second blade assembly in such an instance, their interaction does not work so that the efficiency of rotation decreases. It is therefore important to keep the first blade assembly 1 and second blade assembly 3 from coinciding with each other while they rotate. The results of the experiments have proved that the eighth embodiment of the present invention produces a considerable effect to achieve the above purpose although it has a simple structure.

When electromagnets are used as the magnets 81 and 82, the magnets 81 and 82 can be turned on and off by turning the power on and off. Therefore, the magnets 81 and 82 may be turned off under normal conditions to perform the same operation as described in conjunction with the first embodiment, and turned on as needed to prevent the first blade assembly 1 and second blade assembly 3 from coinciding with each other in the direction of rotation while they rotate. To achieve the above purpose, an angle detection means for detecting a relative angle between the first blade assembly 1 and second blade assembly 3 may be furnished to turn on the switch for the electromagnets immediately before the blades 12b of the second blade assembly outrun the blades 12a of the first blade assembly. The eighth embodiment can also be applied to the second to fourth embodiments.

As a modification of the eighth embodiment, the magnet 81 attached to the first blade assembly 1 and the magnet 82 attached to the second blade assembly 3 can be of the different polarity. More specifically, when a N-pole magnet is used as the magnet 81, a S-pole magnet is used as the magnet 82, and vice versa. In this case, both of the magnet 81 (for example, N-pole) and the magnet 82 (for example, S-pole) cannot be directly attached to the base of a blade 12a of the first blade assembly 1 and blade 12b of the second blade assembly 3 respectively. And further, when the magnets 81 and 82 are attached to suitable places of the blades 12a or 12b, or the hub 13a or 13b, their angular positions need to be adjusted in the direction of rotation of the first blade assembly 1 and second blade assembly 3. The content of the adjustment is that the magnets 81 and 82 are positioned with a small angular displacement therebetween but never face each other when the blades 12a of the first blade assembly 1 coincide with (face) the blades 12b of the second blade assembly 3. By such a construction, the magnets 81 and 82 pull each other so that the blades 12b of the second blade assembly cannot possibly coincide with the blades 12a of the first blade assembly. This ensures that the first blade assembly 1 and second blade assembly 3 will never coincide with each other in the direction of rotation.

While the invention has been described in conjunction with presently preferred embodiments of the invention and with reference to the accompanying drawings, persons of skill in the art will appreciate that certain changes and modifications may be readily made without departure from the scope and spirit of the invention.

What is claimed is:

1. A wind turbine generator, comprising:

a power generator;

a first blade assembly for being subjected to natural wind velocity to rotate and driving said power generator; and a second blade assembly that is positioned behind said first blade assembly to overlap with said first blade assembly and subjected to the natural wind velocity to rotate for driving said power generator; and clutching means that are positioned between said first blade assembly/said second blade assembly and said power generator to disengage said power generator from said first blade assembly and/or said second blade assembly to reduce a rotary load on said power generator when said first blade assembly and said second blade assembly are loaded.

2. The wind turbine generator according to claim 1, comprising, as said power generator, a power generator for the first blade assembly and a power generator for the second blade assembly.

3. The wind turbine generator according to claim 1 or 2, wherein a one-way clutch is used as said clutching means to invoke clutching when said first blade assembly and/or said second blade assembly are about to rotate faster than said power generator.

4. A wind turbine generator, comprising:

a power generator;

first rotation axis means;

second rotation axis means that are substantially coaxial with said first rotation axis means;

a first blade assembly that is mounted on said first rotation axis means in a rotatable manner and subjected to natural wind velocity to rotate;

a second blade assembly that is positioned behind said first blade assembly to overlap with said first blade assembly, mounted on said second rotation axis means so as to rotate together as one piece, and subjected to natural wind velocity to rotate;

first blade assembly power transmission means that are provided with intermediate clutching means for power transmission interruption and positioned between said first rotation axis means and said power generator;

second blade assembly power transmission means that are provided with intermediate clutching means for power transmission interruption and positioned between said second rotation axis means and said power generator, wherein each of said clutching means are configured as a one-way clutch that invokes clutching when corresponding said blade assembly is about to rotate faster than corresponding said power generator.

5. The wind turbine generator according to claim 4, comprising, as said power generator, a first blade assembly power generator which is coupled to said first blade assembly power transmission means and a second blade assembly power generator which is coupled to said second blade assembly power transmission means.

6. A wind turbine generator, comprising:

a power generator;

first rotation axis means;

second rotation axis means that are substantially coaxial with said first rotation axis means;

a first blade assembly that is mounted on said first rotation axis means in a rotatable manner an subjected to natural wind velocity to rotate;

a second blade assembly that is positioned behind said first blade assembly to overlap with said first blade assembly, mounted on said second rotation axis means so as to rotate together as one piece, and subjected to the natural wind velocity to rotate;

first blade assembly power transmission means that are positioned between said first rotation axis means and said power generator;

second blade assembly power transmission means that are positioned between said second rotation axis means and said power generator; and one-way clutching means that are positioned between said first rotation axis means and said second rotation axis means to invoke clutching when said second ration axis means are about to rotate faster than said first rotation axis means.

7. A wind turbine generator, comprising:

a power generator;

first rotation axis means;

second rotation axis means that are substantially coaxial with said first rotation axis means;

a first blade assembly that is mounted on said first rotation axis means in a rotatable manner and subjected to natural wind velocity to rotate;

a second blade assembly that is positioned behind said first blade assembly to overlap with said first blade assembly, mounted on said second rotation axis means so as to rotate together as one piece, and subjected to the natural wind velocity to rotate;

power transmission means that are positioned between said second rotation axis means and said power generator; and one-way clutching means that are positioned between said first rotation axis means and said second rotation axis means to invoke clutching when said second rotation axis means are about to rotate faster than said first rotation axis means.

8. A wind turbine generator, comprising:

a power generator;

first rotation axis means;

second rotation axis means that are substantially coaxial with said first rotation axis means;

a first blade assembly that is mounted on said first rotation axis means in a rotatable manner and subjected to natural wind velocity to rotate;

a second blade assembly that is positioned behind said first blade assembly to overlap with said first blade assembly, mounted on said second rotation axis means so as to rotate together as one piece, and subjected to the natural wind velocity to rotate;

power transmission means that are positioned between said first rotation axis means and said power generator; and one-way clutching means that are positioned between said first rotation axis means and said second rotation axis means to invoke clutching when said second rotation axis means are about to rotate faster than said first rotation axis means.

9. The wind turbine generator according to claim 1, wherein magnets have the same polarity and facing each other are mounted on the first blade assembly and second blade assembly.

10. A wind turbine generator comprising:

a plurality of coaxial blade assemblies including a first blade assembly and a second blade assembly mounted on one axis and overlapping in a front-to-rear direction to be subjected to natural wind velocity to rotate for driving a power generator, with a specified angular difference being maintained between the blades of said blade assemblies in accordance with a front-rear distance between said blade assemblies to prevent the blades of said blade assemblies from coinciding with each other in a direction of rotation; and a rotary angle adjustment mechanism is provided between said first blade assembly and said second blade assembly to change a rotary angle of a blade assembly relative to said axis in accordance with a newly reached position when at least one of said first blade assembly and said second blade assembly changes its front-rear position over said axis.

11. A wind turbine generator, comprising:

a power generator;

a first blade assembly that is subjected to natural wind velocity to rotate for driving said power generator;

a second blade assembly that is positioned behind said first blade assembly to overlap with said first blade assembly, and subjected to the natural wind velocity to rotate for driving said power generator;

clutching means that are positioned between said first blade assembly/said second blade assembly and said power generator to disengage said power generator from said first blade assembly and/or said second blade assembly to reduce a rotary loan on said power generator when said first blade assembly and said second blade assembly are loaded; and a lock bearing that is positioned between said first blade assembly and said second blade assembly to maintain relative rotary positions of the blades of said first blade assembly and the blades of said second blade assembly within a predetermined angular range.

12. The wind turbine generator according to claim 11, wherein said lock bearing maintains the relative rotary positions of the blades of said first blade assembly and the blades of said second blade assembly within a predetermined angular range so as to prevent the blades of the first and second blade assemblies from coinciding with each other.

13. The wind turbine generator according to claim 1, wherein the blades of said first blade assembly are shorter than the blades of said second blade assembly.

14. The wind turbine generator according to claim 4, wherein the blades of said first blade assembly are shorter than the blades of said second blade assembly.

15. The wind turbine generator according to claim 5, wherein the blades of said first blade assembly are shorter than the blades of said second blade assembly.

16. The wind turbine generator according to claim 7, wherein the blades of said first blade assembly are shorter than the blades of said second blade assembly.

17. The wind turbine generator according to claim 8, wherein the blades of said first assembly are shorter than the blades of said second blade assembly.

18. The wind turbine generator according to claim 11, wherein the blades of said first assembly are shorter than the blades of said second blade assembly.

* * * * *